(12) United States Patent
Mark et al.

(10) Patent No.: US 9,952,848 B2
(45) Date of Patent: Apr. 24, 2018

(54) DEPENDENCY-AWARE TRANSFORMATION OF MULTI-FUNCTION APPLICATIONS FOR ON-DEMAND EXECUTION

(71) Applicant: Samsung Electronics Co., Ltd., Suwon-si, Gyeonggi-do (KR)

(72) Inventors: Gilead Mark, Palo Alto, CA (US); Manikandan Sankaranarasimhan, Fremont, CA (US); Kalyan Desineni, Mountain View, CA (US); Eric Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/976,683

(22) Filed: Dec. 21, 2015

(65) Prior Publication Data

US 2017/0177318 A1 Jun. 22, 2017

(51) Int. Cl.
| | |
|---|---|
| *G06F 9/44* | (2018.01) |
| *G06F 9/445* | (2018.01) |
| *G06F 17/30* | (2006.01) |
| *G06F 3/0484* | (2013.01) |
| *G06F 3/0482* | (2013.01) |
| *H04L 29/08* | (2006.01) |

(52) U.S. Cl.
CPC .............. *G06F 8/61* (2013.01); *G06F 3/0482* (2013.01); *G06F 3/04842* (2013.01); *G06F 17/30554* (2013.01); *G06F 17/30864* (2013.01); *H04L 67/10* (2013.01)

(58) Field of Classification Search
None
See application file for complete search history.

(56) References Cited

U.S. PATENT DOCUMENTS

| 7,233,790 | B2 | 6/2007 | Kjellberg et al. | |
|---|---|---|---|---|
| 7,343,625 | B1 | 3/2008 | Zaidi et al. | |
| 8,281,401 | B2 | 10/2012 | Pennington et al. | |
| 8,731,942 | B2 * | 5/2014 | Cheyer | G06F 17/3087 704/270 |

(Continued)

OTHER PUBLICATIONS

Wirthlin et al, "IP Delivery for FPGAs Using Applets and JHDL", ACM, pp. 2-7, 2002.

(Continued)

*Primary Examiner* — Matthew Brophy
(74) *Attorney, Agent, or Firm* — Jefferson IP Law, LLP

(57) ABSTRACT

A mobile device includes a user interface allowing a user to enter search parameters. A query wrapper module generates a query wrapper based on the entered search parameters. A search system communication module transmits the query wrapper to a search system and receives a set of results from the search system. A first result corresponds to a first applet. A results presentation module displays the set of results to the user. An access mechanism module, in response to the user selecting the first result, selectively triggers an applet request to be sent to an applet distribution system. The applet request instructs the applet distribution system to transmit the first applet to the mobile device. The first applet includes native code for execution on an operating system of the mobile device. The first applet from the applet distribution system is executed.

23 Claims, 16 Drawing Sheets

(56) References Cited

U.S. PATENT DOCUMENTS

| | | | |
|---|---|---|---|
| 8,898,148 B1* | 11/2014 | Yagnik | G06F 17/30867 707/721 |
| 8,930,191 B2* | 1/2015 | Gruber | G06F 17/3087 704/246 |
| 9,424,554 B2 | 8/2016 | Hayton et al. | |
| 9,451,043 B2* | 9/2016 | Zhao | H04L 67/08 |
| 9,483,388 B2 | 11/2016 | Sankaranarasimhan et al. | |
| 9,489,692 B1* | 11/2016 | Yu | G06Q 30/0275 |
| 2003/0036848 A1* | 2/2003 | Sheha | G01C 21/3679 701/468 |
| 2012/0191694 A1* | 7/2012 | Gardiol | G06F 17/2715 707/709 |
| 2012/0284247 A1* | 11/2012 | Jiang | G06F 17/30867 707/706 |
| 2012/0284256 A1* | 11/2012 | Mahajan | G06F 17/3087 707/722 |
| 2013/0185074 A1* | 7/2013 | Gruber | G06F 17/3087 704/257 |
| 2013/0246932 A1* | 9/2013 | Zaveri | G06F 3/017 715/740 |
| 2013/0290319 A1* | 10/2013 | Glover | G06F 17/3053 707/723 |
| 2014/0040231 A1* | 2/2014 | Lin | G06F 17/30867 707/708 |
| 2014/0250147 A1* | 9/2014 | Shapira | G06F 17/30864 707/770 |
| 2014/0317073 A1* | 10/2014 | Jain | G06F 17/3053 707/706 |
| 2014/0321448 A1* | 10/2014 | Backholm | H04W 76/045 370/338 |
| 2014/0359595 A1* | 12/2014 | Sehgal | G06F 8/61 717/171 |
| 2015/0026146 A1* | 1/2015 | Mance | G06F 17/30991 707/706 |
| 2015/0039580 A1* | 2/2015 | Subhedar | G06F 17/30864 707/706 |
| 2015/0046424 A1* | 2/2015 | Lin | G06F 17/30867 707/708 |
| 2015/0046425 A1* | 2/2015 | Lin | G06F 17/30867 707/708 |
| 2015/0081658 A1* | 3/2015 | Meyles | G06F 17/30501 707/706 |
| 2015/0170050 A1* | 6/2015 | Price | G06N 99/005 706/13 |
| 2015/0242510 A1* | 8/2015 | Shapira | G06F 17/30392 707/706 |
| 2015/0254367 A1* | 9/2015 | Kagan | G06F 3/0482 707/706 |
| 2016/0026462 A1* | 1/2016 | Lang | G06F 8/52 717/121 |
| 2016/0188684 A1* | 6/2016 | Glover | G06F 17/30864 707/722 |
| 2016/0253430 A1* | 9/2016 | Shapira | G06F 17/30864 707/722 |

OTHER PUBLICATIONS

U.S. Appl. No. 14/976,640, filed Dec. 21, 2015, Gilead Mark.
U.S. Appl. No. 15/245,293, filed Aug. 24, 2016, Gilead Mark.

* cited by examiner

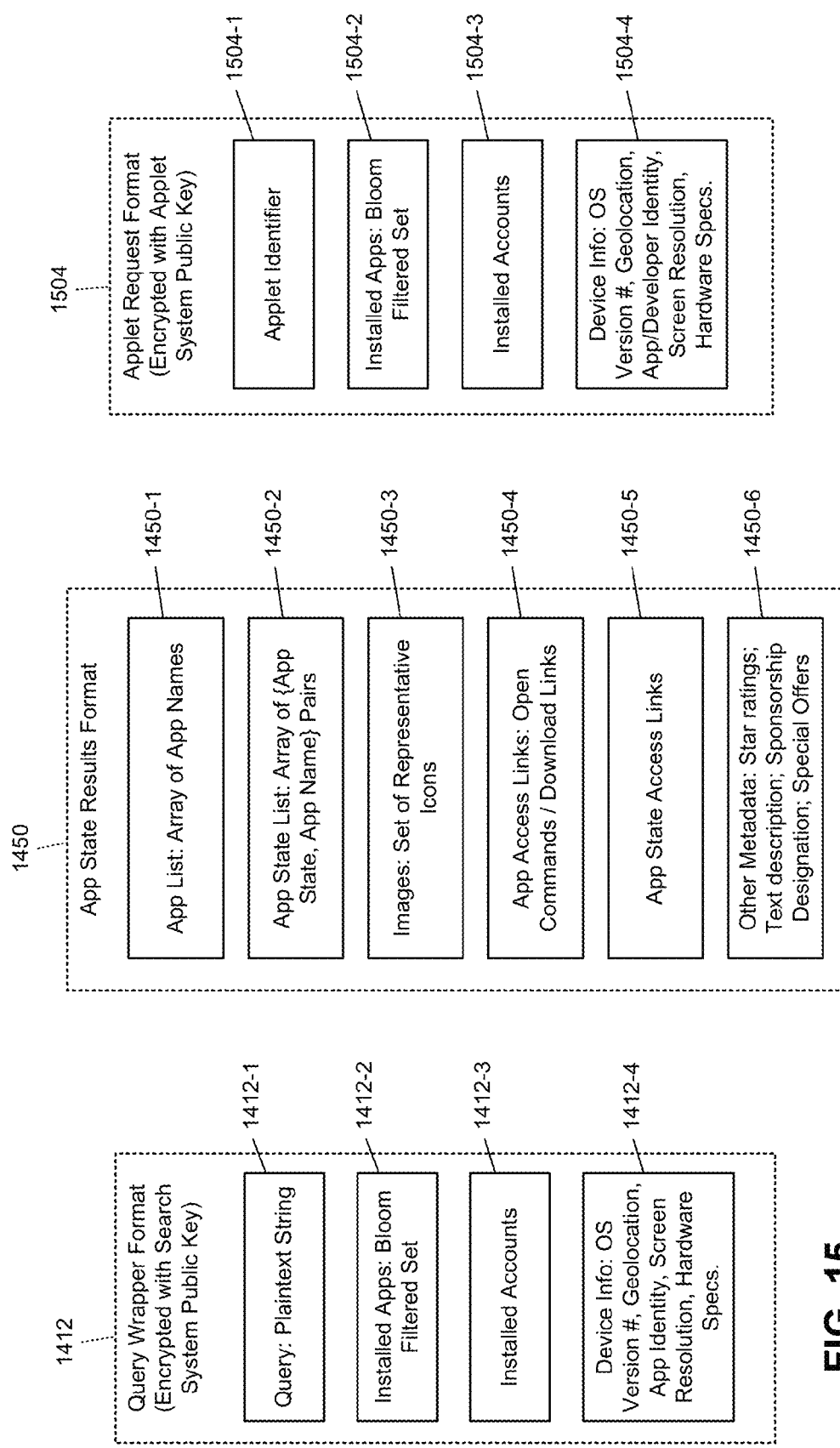

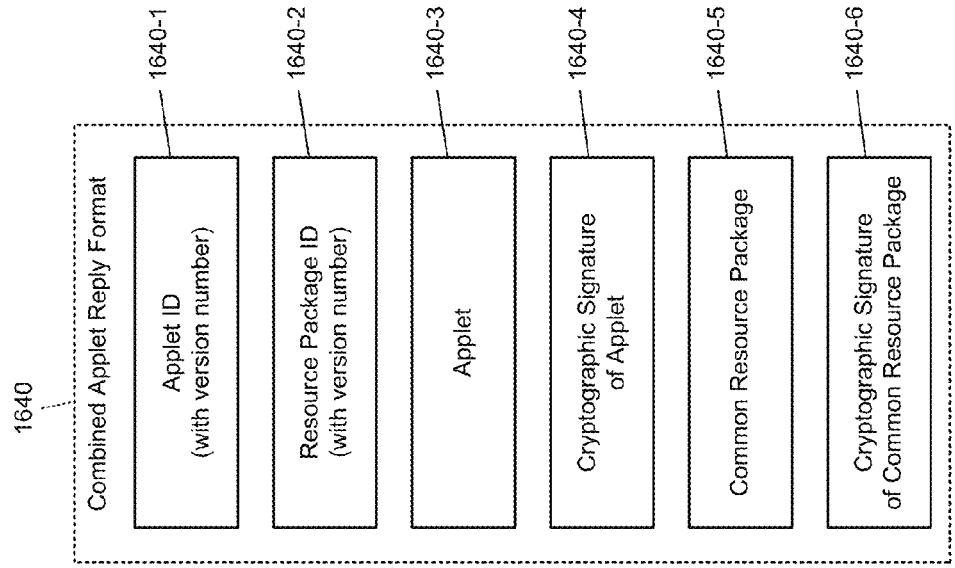
FIG. 20
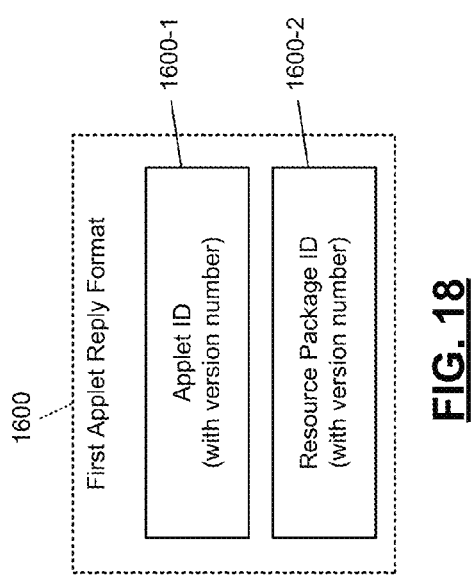
FIG. 18
FIG. 19

DEPENDENCY-AWARE TRANSFORMATION OF MULTI-FUNCTION APPLICATIONS FOR ON-DEMAND EXECUTION

FIELD

The present disclosure relates to mobile application search and more particularly to transforming multi-function applications into independent code segments for on-demand execution and returning the independent code segments in response to search queries.

BACKGROUND

In recent years, the use of Internet-connected devices such as smartphones has grown exponentially. The number and variety of available software applications (or, equivalently, apps) for such devices has similarly grown by orders of magnitude. Presently, many diverse functions can be performed and many diverse sets of data can be analyzed on any given Internet-connected device. The applications that offer this functionality and data span business-oriented applications, educational applications, games, new applications, shopping applications, messaging applications, media streaming applications, social media applications, etc.

With such a wide array of available applications, many users of Internet-connected devices are not aware of the availability of applications that may perform functions and/or provide data of interest to the users. Even app developers, who generally focus on one segment of the market for applications, are unable to keep up to date on all of the applications that their users might find valuable in other segments. Further, no developer can expertly implement even a fraction of the spectrum of functionality available across the application ecosystem.

As a result, for any particular function, it is likely that most users do not already have an app installed that performs that particular function optimally. However, the user may be hesitant to install new applications for a variety of reasons. The user may not trust the application or the developer. Or the user may not want to install more applications than necessary, as installing more applications occupies device resources as well as increases cognitive load when using a device with an intimidating list of installed applications.

Further, the user may not want to go through the multiple interface steps and time delay of downloading and installing an application. The user may not want to evaluate and selectively approve permissions for the new app. In addition, the user may not know whether this action will ever be performed again or whether this new app will satisfactorily perform the action. As one more example, the user may not want to install a new app when much of the functionality of the app is either duplicative of apps the user already has installed or is simply unwanted.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A mobile device includes a user interface configured to allow a user to enter one or more search parameters. The mobile device includes a query wrapper module configured to generate a query wrapper based on the entered search parameters. The mobile device includes a search system communication module configured to transmit the query wrapper to a search system and receive a set of results from the search system. The set of results selectively includes a first result corresponding to a first applet. The mobile device includes a results presentation module configured to display the set of results to the user. The mobile device includes an access mechanism module configured to, in response to the user selecting the first result, selectively trigger an applet request to be sent to an applet distribution system. The applet request instructs the applet distribution system to transmit the first applet to the mobile device. The mobile device includes a sandbox configured to execute the first applet from the applet distribution system while isolating the first applet from other applications on the mobile device. The first applet includes native code for execution on an operating system of the mobile device.

In other features, the mobile device includes a wireless transceiver configured to transmit the query wrapper to the search system, receive the set of results from the search system, transmit the applet request to the applet distribution system, and receive the first applet from the applet distribution system. In other features, the mobile device includes a set of common libraries configured to selectively be dynamically linked with an applet executing in the sandbox.

In other features, the user interface, the query wrapper module, the search system communication module, the results presentation module, the access mechanism module, and the sandbox are implemented as part of a search application downloaded from a digital distribution platform and installed on the mobile device. In other features, the user interface, the query wrapper module, the search system communication module, the results presentation module, the access mechanism module, and the sandbox are implemented as part of the operating system.

In other features, the query wrapper module is configured to include, within the query wrapper, a representation of applications installed on the mobile device. In other features, the user interface is configured to present visual output from the first applet executing in the sandbox to the user. In other features, the first applet was derived from a second application state of a second application. The user interface is configured to provide a user interface element associated with the visual output from the first applet. The user interface is configured to, in response to user actuation of the user interface element, trigger downloading and installation of the second application onto the mobile device.

In other features, the set of results selectively includes a second result corresponding to a first application state of a first application installed on the mobile device. The access mechanism module is configured to, in response to the user selecting the second result, open the first application and, without further involvement of the user, transition to the first application state within the first application.

In other features, the set of results selectively includes a second result including a first access mechanism and a second access mechanism. The first access mechanism corresponds to a second application state of a second application. The second access mechanism corresponds to a second applet derived from the second application state. The results presentation module is configured to, in response to the second application not being installed on the mobile device, offer both the first access mechanism and the second access mechanism to the user. The access mechanism module is configured to, in response to the second application not being installed on the mobile device and in response to the user selecting a user interface element corresponding to the first access mechanism, download and install the second application, open the second application, and, without further involvement of the user, transition to the second application state within the second application. The access mechanism module is configured to, in response to the second application not being installed on the mobile device and in response to the user selecting a user interface element corresponding to the second access mechanism, trigger a second applet request to be sent to the applet distribution system. The second applet request instructs the applet distribution system to transmit the second applet to the mobile device for execution in the sandbox.

In other features, the set of results selectively includes a second result including a first access mechanism and a second access mechanism. The first access mechanism corresponds to a second application state of a second application. The second access mechanism corresponds to a second applet derived from the second application state. The results presentation module is configured to, in response to the second application being installed on the mobile device, offer only the first access mechanism to the user; and in response to the second application not being installed on the mobile device, offer both the first access mechanism and the second access mechanism to the user. The access mechanism module is configured to, in response to the second application being installed on the mobile device, and in response to the user selecting a user interface element corresponding to the first access mechanism, open the second application and, without further involvement of the user, transition to the second application state within the second application. The access mechanism module is configured to, in response to the second application not being installed on the mobile device, and in response to the user selecting a user interface element corresponding to the first access mechanism, download and install the second application, open the second application, and, without further involvement of the user, transition to the second application state within the second application. The access mechanism module is configured to, in response to the second application not being installed on the mobile device, and in response to the user selecting a user interface element corresponding to the second access mechanism, trigger a second applet request to be sent to the applet distribution system. The second applet request instructs the applet distribution system to transmit the second applet to the mobile device for execution in the sandbox.

In other features, the mobile device includes an applet data store configured to selectively store the first applet received from the applet distribution system. The access mechanism module is configured to, in response to a subsequent result corresponding to the first applet being selected by the user, avoid triggering the applet request and provide the stored first applet from the applet data store to the sandbox.

In other features, the mobile device includes an applet distribution system communication module configured to, in response to the subsequent result being selected by the user, send an applet message to the applet distribution system, the applet message designating the first applet; analyze a response to the applet message to determine a most recent version number of the first applet; in response to the first applet being stored in the applet data store and a version number of the first applet in the applet data store matching the most recent version number, provide the stored first applet from the applet data store to the sandbox; and in response to the most recent version of the first applet not being stored in the applet data store, download the most recent version of the first applet from the applet distribution system.

A method of operating a mobile device includes presenting a user interface to allow a user to enter one or more search parameters. The method includes generating a query wrapper based on the entered search parameters. The method includes transmitting the query wrapper to a search system. The method includes receiving a set of results from the search system. The set of results selectively includes a first result corresponding to a first applet. The method includes displaying the set of results to the user. The method includes, in response to the user selecting the first result, selectively triggering an applet request to be sent to an applet distribution system. The applet request instructs the applet distribution system to transmit the first applet to the mobile device. The method includes executing the first applet from the applet distribution system while isolating the first applet from other applications on the mobile device. The first applet includes native code for execution on an operating system of the mobile device.

In other features, the query wrapper is transmitted to the search system via a wireless transceiver, the set of results is received from the search system via the wireless transceiver, the applet request is transmitted to the applet distribution system via the wireless transceiver, and the first applet is received from the applet distribution system via the wireless transceiver. In other features, the method includes storing a set of common libraries. The method includes selectively dynamically linking one or more of the set of common libraries with an applet executing in a sandbox.

In other features, the method includes including, within the query wrapper, a representation of applications installed on the mobile device. In other features, the method includes presenting visual output from the executing first applet to the user and passing user interface events generated by the user to the executing first applet. In other features, the first applet was derived from a second application state of a second application. The method includes providing a user interface element associated with the visual output from the first applet. The method includes, in response to user actuation of the user interface element, triggering downloading and installation of the second application onto the mobile device.

In other features, the set of results selectively includes a second result corresponding to a first application state of a first application installed on the mobile device. The method includes, in response to the user selecting the second result, opening the first application and, without further involvement of the user, transitioning to the first application state within the first application.

In other features, the set of results selectively includes a second result including a first access mechanism and a second access mechanism. The first access mechanism corresponds to a second application state of a second application. The second access mechanism corresponds to a second applet derived from the second application state. The method includes, in response to the second application not being installed on the mobile device, offering both the first access mechanism and the second access mechanism to the user. The method includes, in response to the second application not being installed on the mobile device and in response to the user selecting a user interface element corresponding to the first access mechanism, (i) downloading and installing the second application, (ii) opening the second application, and, (iii) without further involvement of the user, transitioning to the second application state within the second application. The method includes, in response to the second application not being installed on the mobile device and in response to the user selecting a user interface element corresponding to the second access mechanism, triggering a second applet request to be sent to the applet distribution system. The second applet request instructs the applet distribution system to transmit the second applet to the mobile device for execution.

In other features, the set of results selectively includes a second result including a first access mechanism and a second access mechanism. The first access mechanism corresponds to a second application state of a second application. The second access mechanism corresponds to a second applet derived from the second application state. The method includes, in response to the second application being installed on the mobile device, offering only the first access mechanism to the user. The method includes, in response to the second application not being installed on the mobile device, offering both the first access mechanism and the second access mechanism to the user. The method includes, in response to the second application being installed on the mobile device and in response to the user selecting a user interface element corresponding to the first access mechanism, (i) opening the second application and, (ii) without further involvement of the user, transitioning to the second application state within the second application. The method includes, in response to the second application not being installed on the mobile device and in response to the user selecting a user interface element corresponding to the first access mechanism, (i) downloading and installing the second application, (ii) opening the second application, and, (iii) without further involvement of the user, transition to the second application state within the second application. The method includes, in response to the second application not being installed on the mobile device and in response to the user selecting a user interface element corresponding to the second access mechanism, triggering a second applet request to be sent to the applet distribution system. The second applet request instructs the applet distribution system to transmit the second applet to the mobile device for execution.

In other features, the method includes selectively storing the first applet received from the applet distribution system in the mobile device. The method includes, in response to a subsequent result corresponding to the first applet being selected by the user, (i) avoiding triggering the applet request and (ii) providing the stored first applet from the applet data store for execution.

In other features, the method includes, in response to the subsequent result being selected by the user, sending an applet message to the applet distribution system, the applet message designating the first applet; analyzing a response to the applet message to determine a most recent version number of the first applet; in response to the first applet being stored in the applet data store and a version number of the first applet in the applet data store matching the most recent version number, providing the stored first applet from the applet data store for execution; and in response to the most recent version of the first applet not being stored in the applet data store, downloading the most recent version of the first applet from the applet distribution system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 15 is an example format of a query wrapper.

FIG. 16 is an example format of a query response.

FIG. 17 is an example format of an applet request.

FIG. 18 is an example format of a first applet reply.

FIG. 19 is an example format of a second applet reply.

FIG. 20 is an example format of a combined applet reply.

In the drawings, reference numbers may be reused to identify similar and/or identical elements.

DETAILED DESCRIPTION

When a user of a device wants to perform an action, there may be a wide variety of applications that can perform that action. However, on the user's device, the installed applications may either be incapable of performing that action or may be inferior with respect to that action compared to other available apps. In this disclosure, the term "app" is used interchangeably with the unabbreviated "application." An app is generally considered to relate to mobile devices, but no such restriction is intended by the use of "app" in this disclosure.

If a search capability of the operating system or of a separate search app allows the user to identify applications that allow various actions to be performed, the user may be hesitant to install new applications for a variety of reasons, as discussed above. So even though an app state result may be available that can take the user directly to the useful state of a new app, the user may not want to select such a result.

According to the present disclosure, search results can include not just deep links to states within apps, but can provide pre-packaged executables (referred to as "applets") that perform specific actions. Similarly, content from sources other than search results, such as a curated content provider or an advertisement, may provide applets to allow enhanced user interaction.

These applets are created by extracting individual actions (also referred to as functions) from a target app. This extraction may be performed by an automated computer process that first determines the various functions, then determines the code those functions depend on and the resources (such as text, images, and sounds) that are accessed by that code. The code and resources required for a function are repackaged as an applet that can be provided to the user device.

Segments of code in the original application and the extracted applets are at least partially native. For example, in the ANDROID operating system, native code may include Dex bytecode for execution in the Android runtime (ART) or Dalvik. Native code is not limited to commands specific to the hardware architecture of the user device, such as ARM assembly instructions.

The search functionality on the user device, which may be incorporated into a standalone search app, downloads the applet and executes the applet in a sandbox. This provides the functionality of the applet with the user permissions of the search app, and with a minimal download time. Further, the applet is not installed (in the same way that a regular app is) and therefore does not appear in the list of applications installed on the device, which may be especially valuable when a large number of applets have been used. In various implementations, one or more applets may be cached by the search app. In this way, an applet that a user repeatedly executes does not have to be downloaded each time before execution.

Figure 1:
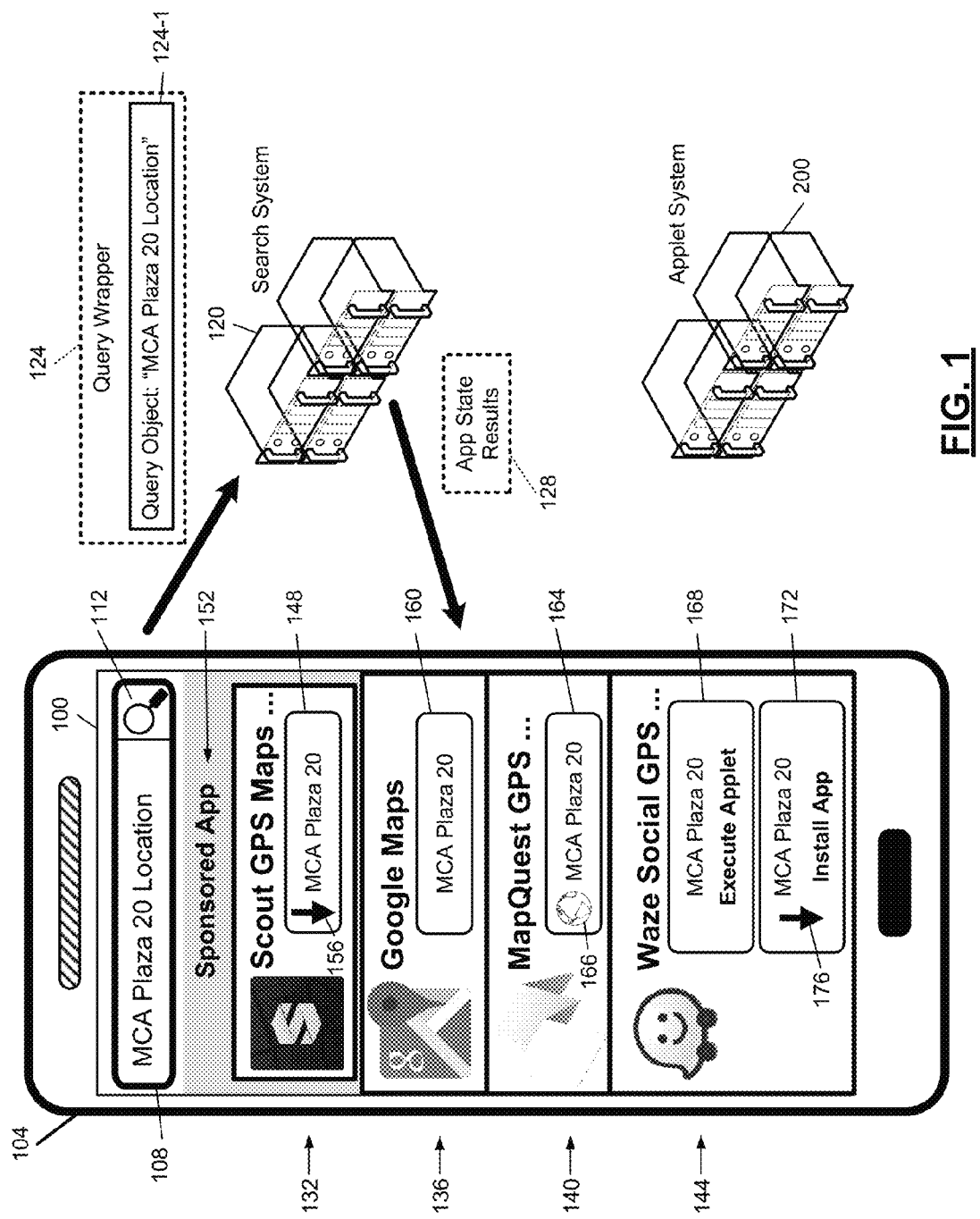
FIG. 1 is a combination block diagram and example user interface for performing a search according to the principles of the present disclosure.

In FIG. 1, an example search app 100 is shown executing on a user device 104. The user device 104 can include a smartphone, a tablet, a laptop, a wearable device, etc. A search textbox 108 allows the user to type in a text query and a user interface element, such as a button 112 (with an image of a magnifying glass), causes the text query to be sent to a search system 120. Specifically, a query wrapper 124 may be formed by the search app 100 and transmitted to the search system 120. In various implementations, a query wrapper includes a query object 124-1, which may store a string holding the text query entered by the user. In this particular example, the query is for the location of a movie theater, "MCA Plaza 20."

In response to the query wrapper 124, the search system 120 identifies apps and app states that perform the function the user appears to be interested in according to the query wrapper 124. The search system 120 provides app state results 128 to the search app 100, designating apps and app states of interest. The app state results 128 may include deep view cards related to the selected app states.

A deep view card (DVC) for an application or a state of an application shows additional information, not just the identification of the application or application state. For example, the information may include a title of the application state or a description of the application state, which may be a snippet of text from the application state. Other metadata may be provided from the application state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping application to get navigation directions to the establishment. Other interactions with the DVC (such as tapping or clicking any other area of the DVC) may take the user to the indicated state or application. As described in more detail below, this may be accomplished by opening the relevant app or, if the app is not installed, opening a website related to the desired application state. In other implementations, an app that is not installed may be downloaded, installed, and then executed in order to reach the desired application state.

In other words, a DVC includes identifying information for the application or state as well as additional content from the application or state itself. The additional content allows the user to make a more informed choice about which result to choose, and may even allow the user to directly perform an action without having to navigate to the application state. If the action the user wants to take is to obtain information, in some circumstances the DVC itself may provide the necessary information.

The search app 100 displays the app state results 128. As an example only, the app state results 128 depicted in FIG. 1 include results related to the SCOUT GPS NAVIGATION & MEET UP mapping application 132, the GOOGLE MAPS mapping application 136, the MAPQUEST GPS NAVIGATION & MAPS mapping application 140, and the WAZE SOCIAL GPS MAPS & TRAFFIC mapping application 144.

For the result 132, a button 148 allows the "MCA Plaza 20" state of the SCOUT GPS NAVIGATION & MEET UP application to be accessed. This application is sponsored as indicated by a "sponsored app" legend 152 and visually highlighted with shading. The application is not currently installed on the user's device and therefore accessing the "MCA Plaza 20" state requires downloading the application. This download requirement may be indicated by a graphical representation, such as a down arrow 156.

The result 136 includes a button 160 that allows an "MCA Plaza 20" state to be accessed from the corresponding GOOGLE MAPS mapping application. This application is indicated as already being installed because there is no down arrow shown in the button 160.

The result 140 includes a button 164 allowing an "MCA Plaza 20" state of the MAPQUEST GPS NAVIGATION & MAPS application to be accessed. In this case, a graphical indication 166, such as a globe icon, indicates that a World Wide Web result is available for this state. This World Wide Web result may be used to access the state instead of requiring the app to be downloaded and installed. World Wide Web results are present when the app allows access to some or all of its data through a corresponding website.

The result 144 includes buttons 168 and 172, which give the user the option of executing an applet and installing the entire WAZE SOCIAL GPS MAPS & TRAFFIC app, respectively. The button 172 indicates that the app will be downloaded and installed with a down arrow 176. As described in more detail below, executing the applet using the button 168 may also include downloading the applet before execution.

However, the applet will not be installed through the operating system in the same way as a standard app, saving time when compared to a standard app. The installation may simply include extracting and/or decompressing an applet package into a file storage area of a sandbox, at which point the applet can be executed. In other implementations, the applet may be unpacked and run in the context of the host app, with the same privileges. Generally, given the smaller size of the applet, the download time of a standard app will also be mitigated. When the button 168 is selected by the user, a request is sent to an applet system 200, as described in more detail in FIG. 2.

Applets may be created by developers and provided to the applet system 200. The applet system 200 may also, for some apps, transform the app into separate applets. The separate applets may share common resources but each have independent code that allows the individual applets to be executed separately.

Figure 2:
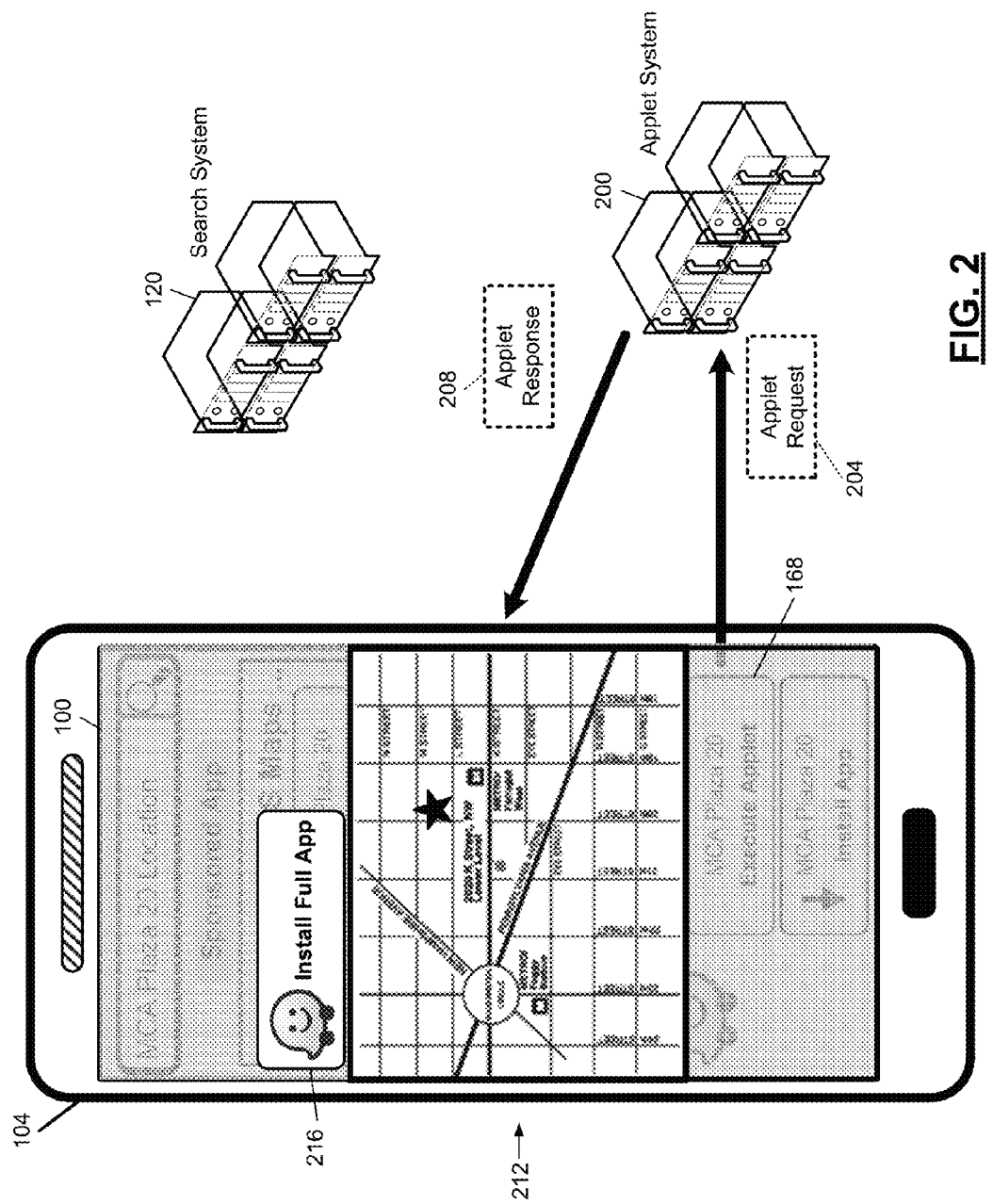
FIG. 2 is a combination block diagram and user interface for an example applet provided in response to one of the search results shown in FIG. 1.

Turning to FIG. 2, in response to the button 168 being actuated by the user, an applet request 204 is sent to the applet system 200. The applet system 200 responds to the search app 100 with an applet response 208. The applet response 208 indicates an identity of the applet corresponding to the button 168 (in this example, the location of the "MCA Plaza 20").

The applet response 208 may also include a copy of the applet. In other implementations, the applet response 208 may identify the applet and the applet's version number, and the search app 100 will request the applet from the applet system 200 if the specified version is not cached within the search app 100. The search app 100 executes the applet, which may display full screen or, as shown in FIG. 2, may display in a part of the screen. When the applet is displayed in part of the screen, such as at 212, the remainder of the screen may be grayed out to indicate focus on the display 212.

The search app 100 may provide the user with a user interface option, such as button 216, to install the full app from which the applet was created. An icon, title, and other information (such as average rating of the app according to a digital distribution platform) may be displayed, along with an indication that the button 216 corresponds to a user desire to install the full app. With the full app, the user can directly access the app from a home screen of the user device 104, access additional functions of the app, and in some cases, access additional features of the function implemented in the applet.

For some applets, no display would be necessary. For example, an applet that removes duplicates from contacts may simply execute without producing a graphical display. To indicate to the user that the execution was successful, such an applet may present a status message to the user, such as a "toast" or an indication in the notification bar.

Figure 3:
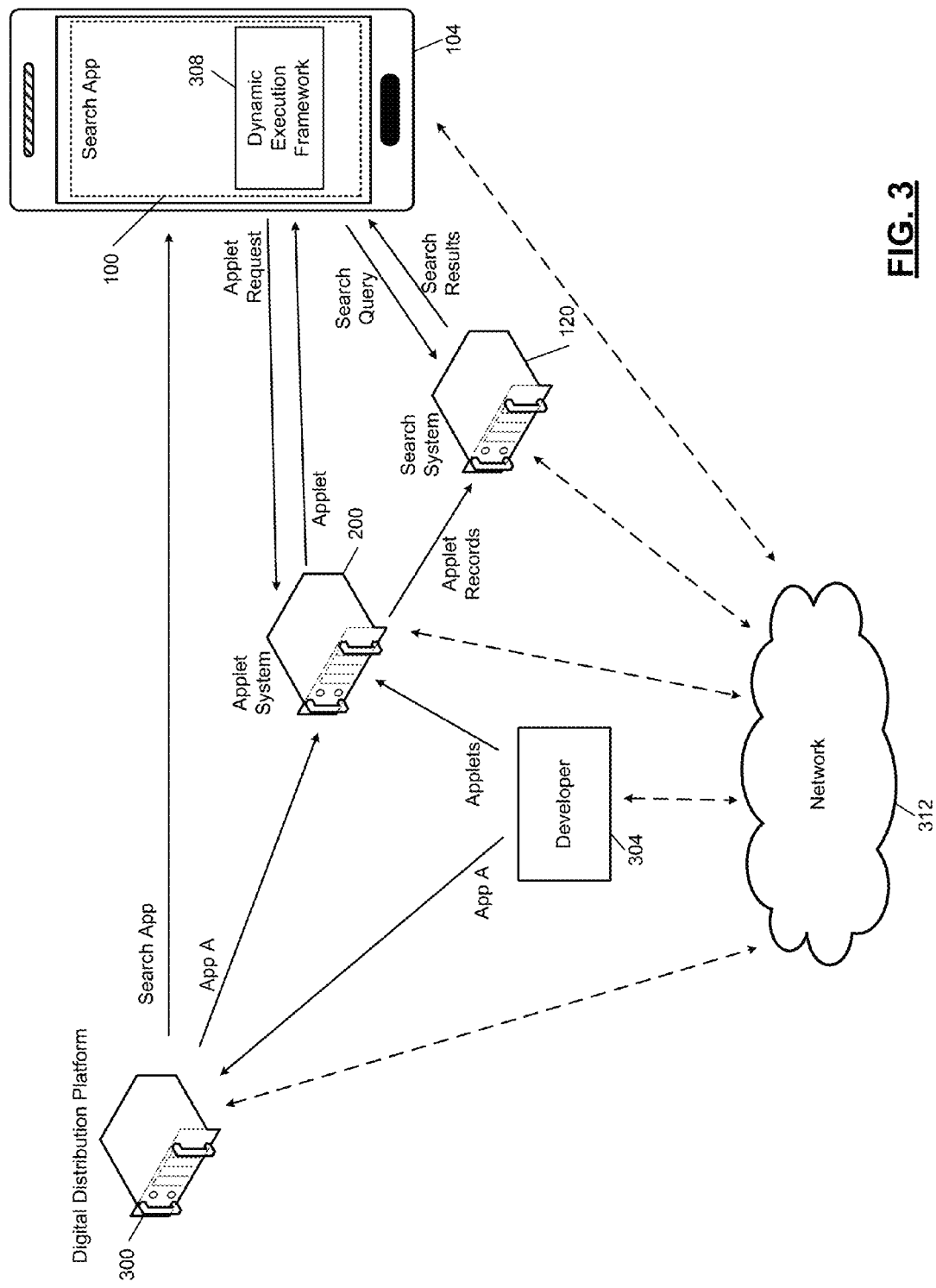
FIG. 3 is a system diagram of the various systems and devices in some implementations of the present disclosure.

In FIG. 3, a digital distribution platform 300 such as the PLAY STORE digital distribution platform by Google Inc., receives an app (for example, "App A") from a developer 304. The digital distribution platform 300 provides App A to the applet system 200. In other implementations, the developer 304 provides App A directly to the applet system 200. The applet system 200 transforms App A into one or more applets, as described in more detail below. In other implementations, the developer 304 may directly supply applets to the applet system 200. Applets can then be provided to the search app 100 for execution within a dynamic execution framework 308.

In various implementations, the dynamic execution framework 308 may be made available to developers for incorporation into their own apps. The dynamic execution framework 308 could then be used to serve search results and/or advertisements to the app. In an advertisement context, the ad may be selected by a search system or by an advertisement system and may include a designation of an applet in order to provide richer functionality when a user interacts with the ad.

Further, a launcher app, web browser app, or mobile operating system may incorporate the dynamic execution framework. This would allow applets to be served and executed, such as from within web results, without requiring a separate search app, such as the search app 100.

The applet system 200 also provides applet records to the search system 120 so the search system 120 can offer the available applets to the search app 100 in response to queries. Dashed lines in FIG. 3 indicate that the user device 104, the search system 120, the applet system 200, the digital distribution platform 300, and the developer 304 generally communicate with each other not directly, but via a network 312. The network 312 may include local area networks and a wide area network, such as the Internet.

The user device 104 may include a processor, memory, and a wireless transceiver configured to transmit packets to and receive packets from the network 312. For example, the wireless transceiver may include a LTE (long term evolution) wireless radio transceiver or a LAN (local area network) wireless radio transceiver, which may conform to IEEE 802.11-2012. Messages, requests, responses, and applets may be transmitted and received over the network 312 using the transceiver.

Figure 4:
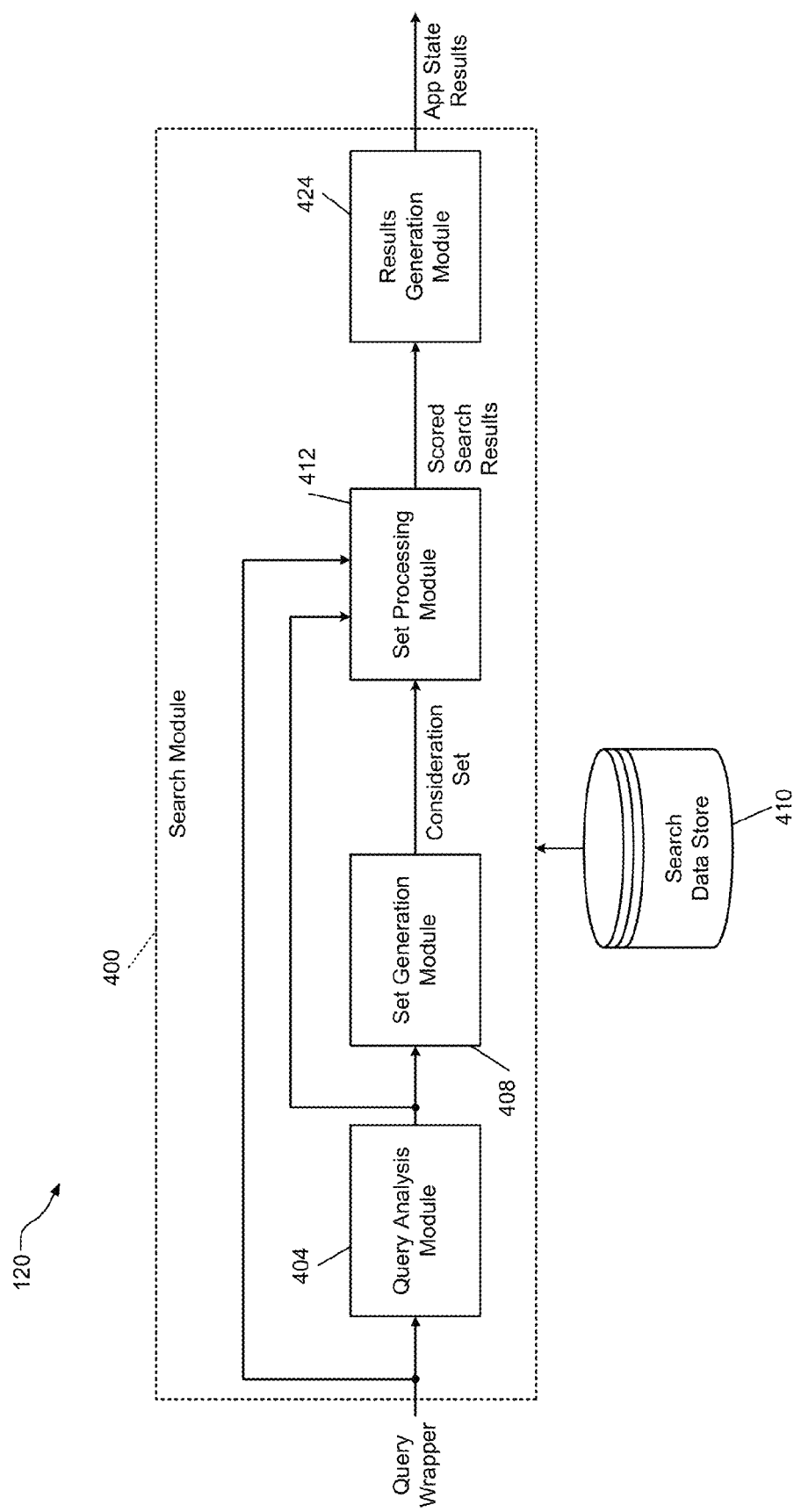
FIG. 4 is a functional block diagram of an example implementation of the search system of FIG. 3.

In FIG. 4, an example implementation of the search system 120 includes a search module 400. The search module 400 includes a query analysis module 404 that receives a query wrapper, such as the query wrapper 124 of FIG. 1. The query analysis module 404 analyzes the text query from the query wrapper. For example, the query analysis module 404 may tokenize the query text, filter the query text, and perform word stemming, synonymization, and stop word removal. The query analysis module 404 may also analyze additional data stored within the query wrapper. The query analysis module 404 provides the tokenized query to a set generation module 408.

The set generation module 408 identifies a consideration set of application state records from a search data store 410 based on the query tokens. Application state records are described in more detail in FIG. 13A and FIG. 13B. In various implementations, the search data store 410 may also include app records. In various implementations, an app record may be stored as an app state record that simply has a predetermined value, such as null, for the specific state of the app.

App state records in the search data store 410 may be generated by crawling and scraping apps according to the principles of the present disclosure. Some or all of the contents of the records of the search data store 410 may be indexed in inverted indices. In some implementations, the set generation module 408 uses the APACHE LUCENE software library by the Apache Software Foundation to identify records from the inverted indices. The set generation module 408 may search the inverted indices to identify records containing one or more query tokens. As the set generation module 408 identifies matching records, the set generation module 408 can include the unique ID of each identified record in the consideration set. For example, the set generation module 408 may compare query terms to an app state name and app attributes (such as a text description and user reviews) of an app state record.

Further, in some implementations, the set generation module 408 may determine an initial score of the record with respect to the search query. The initial score may indicate how well the contents of the record matched the query. For example, the initial score may be a function of term frequency-inverse document frequency (TF-IDF) values of the respective query terms.

A set processing module 412 receives unique IDs of app state records identified by the set generation module 408 and determines a result score for some or all of the IDs. A result score indicates the relevance of an app state with respect to the tokenized query and context parameters. In various implementations, a higher score indicates a greater perceived relevance.

For example, other items in the query wrapper may act as context parameters. Geolocation data may limit the score of (or simply remove altogether) apps that are not pertinent to the location of the user device. A blacklist in the query wrapper may cause the set processing module 412 to remove app records and/or app state records from the consideration set that match the criteria in the blacklist, or to set their score to a null value, such as zero.

The set processing module 412 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 412 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 412 may pair the search query with each app state ID and calculate a vector of features for each {query, ID} pair. The vector of features may include one or more record scoring features, one or more query scoring features, and one or more record-query scoring features. In some implementations, the set processing module 412 normalizes the scoring features in the feature vector. The set processing module 412 can set non-pertinent features to a null value or zero.

The set processing module 412 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 412 can calculate result scores for each of the IDs that the set processing module 412 receives. The set processing module 412 associates the result scores with the respective IDs and outputs the most relevant scored IDs.

A results generation module 424 may choose specific access mechanisms from the application records and app state records chosen by the set processing module 412. The results generation module 424 then prepares a results set to return to the user device. Although called "app state results" here, some of the access mechanisms may correspond to a default state (such as a home page) of an app—these may be a special case of an app state record or may be an app record.

The results generation module 424 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 424 may generate or modify access mechanisms based on the operating system identity and version for the user device to which the results are being transmitted. For example, a script to download, install, open, and navigate to a designated state may be fully formed for a specific operating system by the results generation module 424.

If the results generation module 424 determines that none of the native access mechanisms are likely to be compatible with the user device, the search module 400 may send a web access mechanism to the user device. If no web access mechanism is available, or would be incompatible with the user device for some reason (for example, if the web access mechanism relies on FLASH by Adobe Inc., which is not installed on the user device), the results generation module 424 may omit the result.

Figure 5:
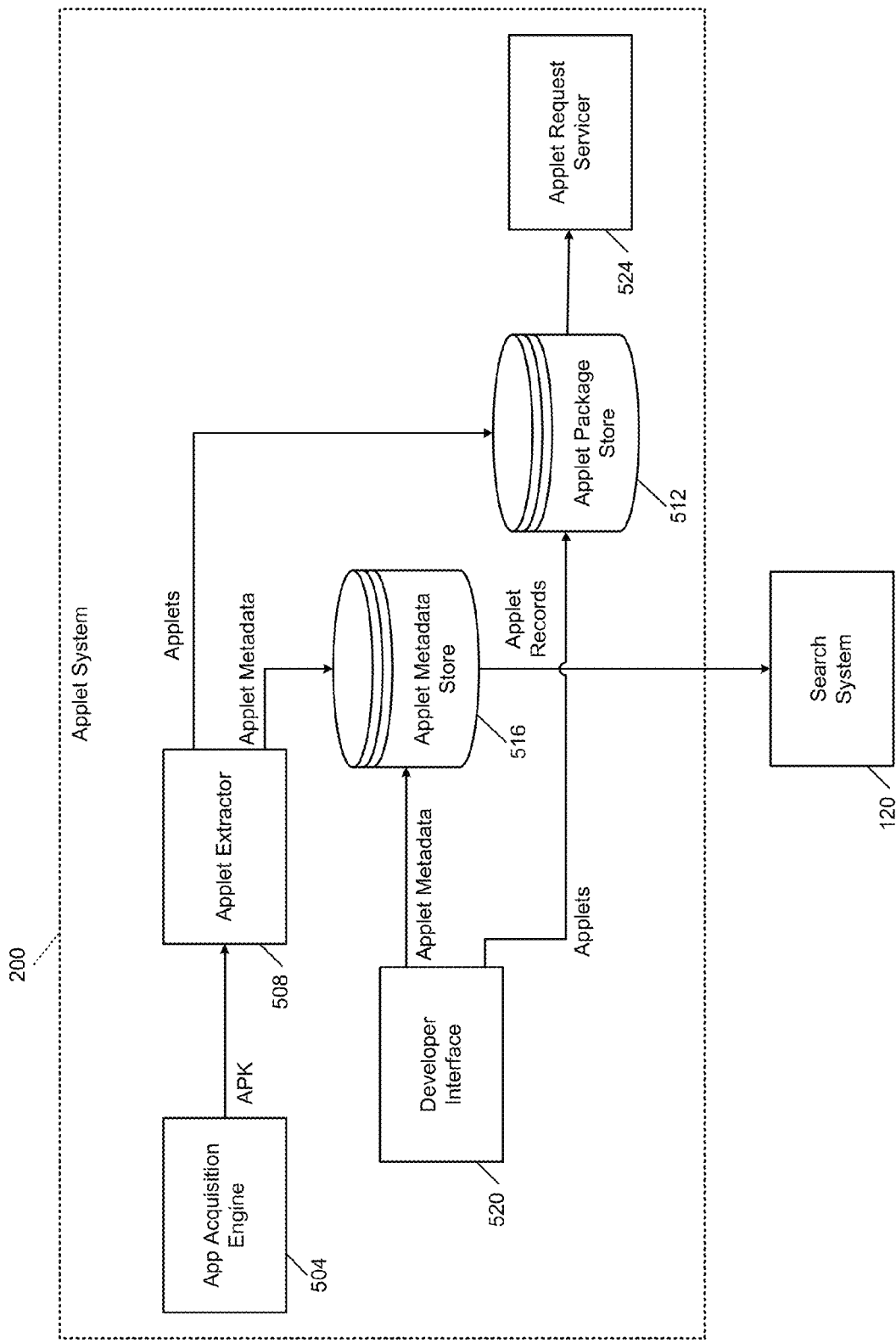
FIG. 5 is a functional block diagram of an example implementation of the applet system of FIG. 3.

In FIG. 5, an example implementation of the applet system 200 includes an app acquisition engine 504 that acquires apps, such as from a digital distribution platform. Each acquired app is provided to an applet extractor. The app may be in the form of, for an ANDROID operating system app, an APK file. An applet extractor 508, as explained in more detail below, transforms an app into one or more applets.

The applets are provided to an applet package store 512, while metadata about the applets is provided to an applet metadata store 516. In some implementations, a developer interface 520 may allow a developer to directly supply applets. The applets are stored in the applet package store 512, while metadata describing the applets is stored in the applet metadata store 516.

The applet metadata store 516 provides records to the search system 120. The applet records may indicate what functions each applet provides and which app each applet corresponds to. Some applets may be specific to one or more entities. In such cases, an applet record for that applet identifies which entities the applet pertains to. For example, for a mapping application, there may be a list of locations that the app can provide. In some situations, the applet extractor 508 may produce an applet for each of the locations.

Based on the applet records, the search system 120 can provide search results that indicate the availability of these applets. An applet request servicer 524 receives requests for applets from user devices and provides those applets from the applet package store 512.

The developer interface 520 may be implemented similarly to, or in conjunction with, a developer portal, as described in commonly assigned U.S. patent application Ser. No. 14/834,373, filed Aug. 24, 2015, and titled "Function-Based Dynamic Application Extension Framework." The entire contents of this application are incorporated by reference.

Figure 6:
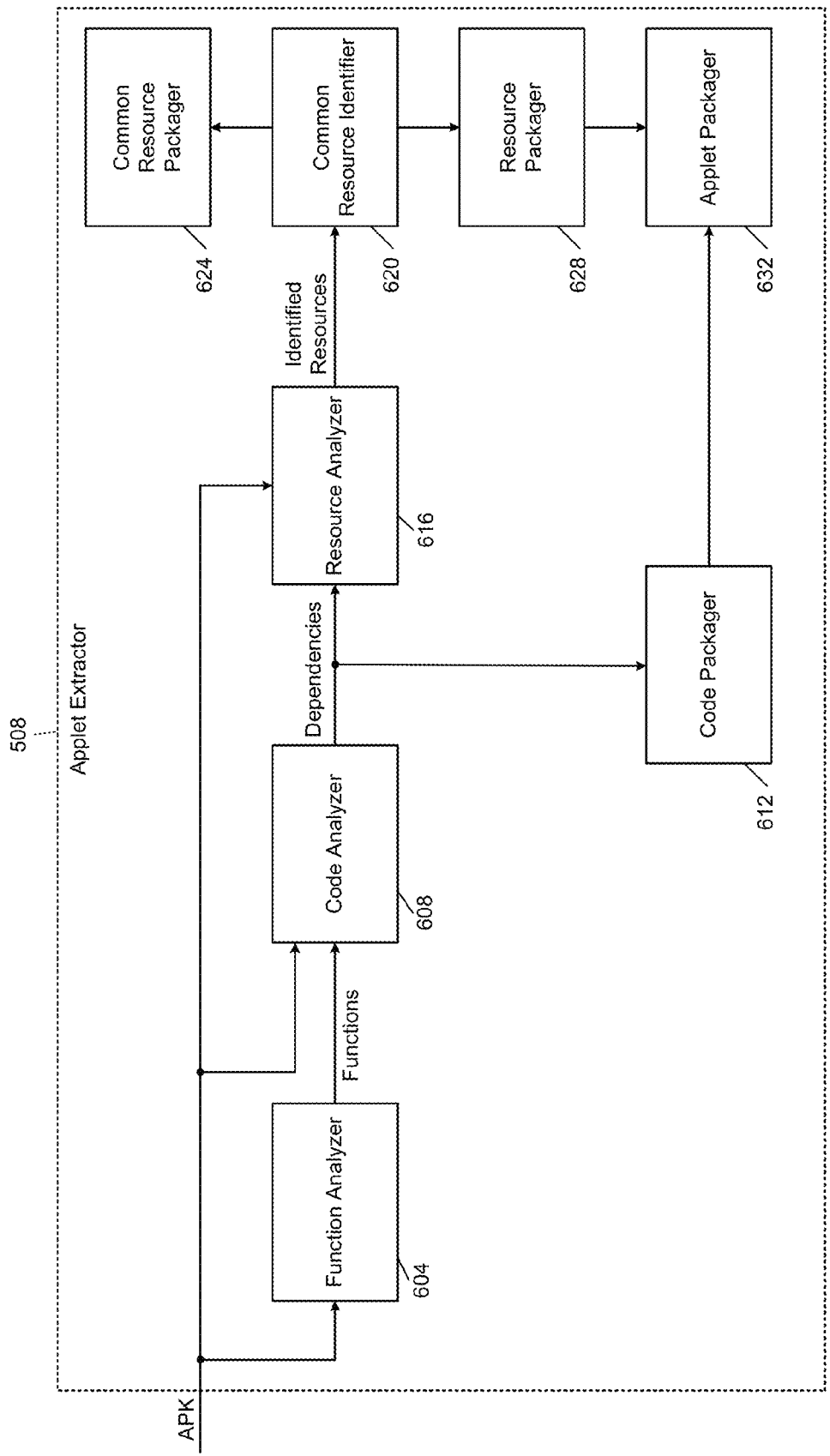
FIG. 6 is a functional block diagram of an example implementation of the applet extractor of FIG. 5.

In FIG. 6, an example implementation of the applet extractor 508 of FIG. 5 is shown. A function analyzer 604 receives an app and identifies functions of the app. The identified functions may not have a human-readable representation and the function analyzer 604 may not assign any semantic description indicating what the function does.

Function analysis is described in more detail in commonly assigned U.S. patent application Ser. No. 14/585,120, filed Dec. 29, 2014, titled "Discovery of Application States," with first-named inventor Manikandan Sankaranarasimhan. The entire disclosure of this application is incorporated by reference.

Some apps may have only a single useful function, but extracting an applet from such an app may still be worthwhile, for many of the reasons described above. For example, the extracted applet can be executed inside a host app without requiring the overhead, delay, and permissions decisions associated with installing a standard app. Further, components of the app, such as a splash screen, an introductory animation, a help system, which may be referred to as trivial functions in the context of this disclosure, can be eliminated from the applet as not being required for the main function. This may save significant space and, therefore, download time.

The identified functions are provided to a code analyzer 608. The code analyzer 608 identifies what code from the app is necessary in order to accomplish each of the functions. The code analyzer 608 determines what dependencies exist in the code—that is, what code is necessary to provide a function as well as the code that is relied upon by that function code.

For example, consider an app that performs functions including displaying a list of attractions near a postal address, providing details about the attractions, and allowing tickets for the attractions to be booked. Each of these functions is identified by the function analyzer 604. Each function has a view, logic, and other code units that are interlinked to provide the display and the code to accomplish the function. In addition, there are resources such as images and text to accompany the code.

Except for trivial functions, a function may require some computation, as opposed to simply copying and displaying an image or video. For example, a mapping app might load some XML/JSON data and then use computation to actually render the map. Similarly, a compass app might use computation to load current magnetic field values and then compute how to render a graphical arrow indicating a compass heading.

The code analyzer 608 uses a dependency analyzer within a static analysis framework (as described in more detail in "Discovery of Application States," referenced above) to identify the logic units, or code, that are linked. For example, the entry point of a function can be identified, and then dependencies for that entry point can be identified. This can be done recursively until all dependencies are identified. Dependencies may include code that generates values that are used to call that function.

In various implementations, a dynamic analysis may also be performed, during which an executing copy of the app is monitored, and the identities of code and data used for a particular function are tracked. Segments of code that were relied on when performing a function during dynamic analysis are then determined to be dependencies of that function.

In various implementations, the code analyzer 608 may identify frequently-encountered code segments. For example, a common code segment may be a "like on Facebook" function that draws the corresponding icon and allows redirecting the user to perform a like on the FACEBOOK social networking platform. These code segments may be referred to as libraries. Another common library may be the APACHE HTTPCOMPONENTS client library for accessing HTTP content.

After reviewing a variety of apps, the code analyzer 608 may determine that some code segments are more common than others, and the highest-frequency outliers can be removed from individual applets and repackaged into the dynamic execution framework that hosts the applets. These applets without the common code segments may be referred to as reduced applets.

In various implementations, the dynamic execution framework may be updated to include newly-identified common code segments. A reduced applet may therefore require a certain version of the dynamic execution framework in order to find the common code segments required for the reduced applet. As a result, the applet system may provide the reduced applet if the version of the dynamic execution framework is high enough, and retain a full version of the applet for older versions of the dynamic execution framework.

The code analyzer 608 identifies code segments related to network calls made by the app when performing functions. These calls may request data from backend services built and maintained by the app's developer. For example only, a movie information app may not contain all of the biographical data of every actor encompassed by the app. Instead, the movie information app makes a network call to a backend services that provides data on actors as requested. As a result, required code for an actor information function may include API (application programming interface) query procedures, API parameters, and transport routines, such as HTTPS (hypertext transfer protocol secure) code.

The code information and dependencies are provided to a code packager 612 and also to a resource analyzer 616. The resource analyzer 616 extracts from the app any resources relied upon by the code or the code's dependencies. The identified resources are provided to a common resource identifier 620. The resource analyzer 616 may exclude resources only shown in an interstitial, such as a loading animation or home state video, that are not necessary to the function of interest.

The common resource identifier 620 identifies when resources are common across multiple functions. When resources are common across multiple functions, the resources may be stored in a common resource package by a common resource packager 624 in order to save space in the applet system. In addition, if a user device executes multiple related applets, the common resources may only need to be downloaded a single time to the user device.

Meanwhile, a resource packager 628 packages together remaining non-common resources for each function. An applet packager 632 combines the packaged code as well as the packaged resources into an applet. The resources and the code may be compressed and/or optimized. For example, if the resources include animation sprites, a new sprite sheet may be created containing only the sprites necessary for the applet. This new sprite sheet may be more compact than the sprite sheet contained in the original app. In addition, the code and resources may be encrypted or cryptographically signed.

Figure 7:
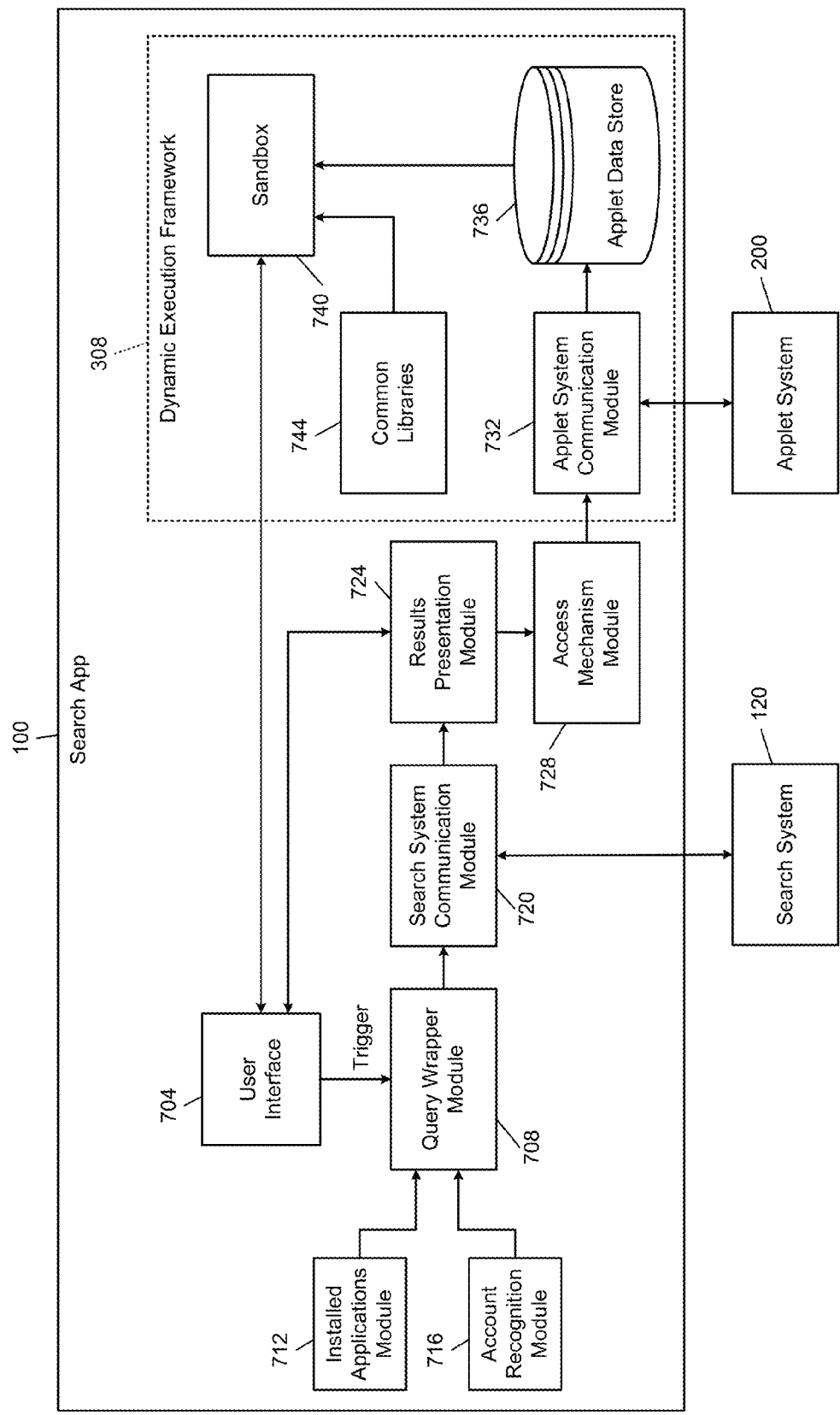
FIG. 7 is a functional block diagram of an example implementation of a search app according to the principles of the present disclosure.

In FIG. 7, an example implementation of the search app 100 includes a user interface 704, an example of which is shown in FIG. 1. When a user initiates a search query using the user interface 704, a trigger is sent to a query wrapper module 708. The query wrapper module 708 constructs a query, which may include an indication of applications installed on the user device from an installed applications module 712. The query may also be based on an indication of existent or active accounts from an account recognition module 716.

The formed query is provided to a search system communication module 720, which sends the query to the search system 120. Results from the search system 120 are provided to a results presentation module 724, which displays the results on the user interface 704. When the user selects one of the results from the user interface 704, an access mechanism module 728 accesses the specified functionality using the corresponding access mechanism. For example, an access mechanism may include opening an app installed on the device and navigating to a specific state of that app. Another access mechanism may simply open a home state of that app. Another mechanism may first download and install an app from a digital distribution platform before opening the app. Further, a web edition of the app may be accessed by the access mechanism module 728 using a web browser.

When the access mechanism is for an applet, the dynamic execution framework 308 may be invoked by the access mechanism module 728. An applet system communication module 732 communicates with the applet system 200 to obtain a corresponding applet. The obtained applet may be stored in an applet data store 736. A sandbox 740 executes the applet in a restricted environment that limits how the applet can interact with the user device. The sandbox 740 may provide a display from the applet to the user interface 704.

In various implementations, the permissions accorded to the applet are a subset of the permissions granted to the search app 100. For this reason, the search app 100 may be configured to request a wide range of permissions. In other implementations, some applets may require additional permissions beyond those of their host app. The host app may therefore request additional permissions from the operating system and the user when executing a new applet that requires those permissions. In various implementations, the extra permissions may be requested each time the applet is executed. In various implementations, the extra permissions may only be needed, and therefore requested, when the user begins to interact with the applet.

A set of common libraries 744 may optionally be present. The common libraries 744 may be those code segments that are present in a higher number of applets compared to other code segments. For example, a code segment may be determined to be common if the code segment's frequency of occurrence in applets is more than a predetermined number (such as three) of standard deviations above the average applet frequency of occurrence. In other implementations, a code segment may be declared common if the frequency of occurrence of the code segment is greater than a predetermined multiple (such as ten) of the average frequency of occurrence. The common libraries 744 can be linked dynamically with an applet and therefore do not have to be included with the applet.

The applet data store 736 may cache copies of applets in case the functionality is needed again. When the applet is cached, the applet may not need to be re-downloaded from the applet system 200. In these situations, the applet system communication module 732 may first obtain an applet identifier, which may include a version number, from the applet system 200. If the applet data store 736 already includes that version of the applet, the applet does not need to be downloaded from the applet system 200. In other implementations, the applet system communication module 732 may begin downloading the applet from the applet system 200 and simply halt, or cancel, the download if the applet data store 736 already has the latest version of the applet.

Figure 8:
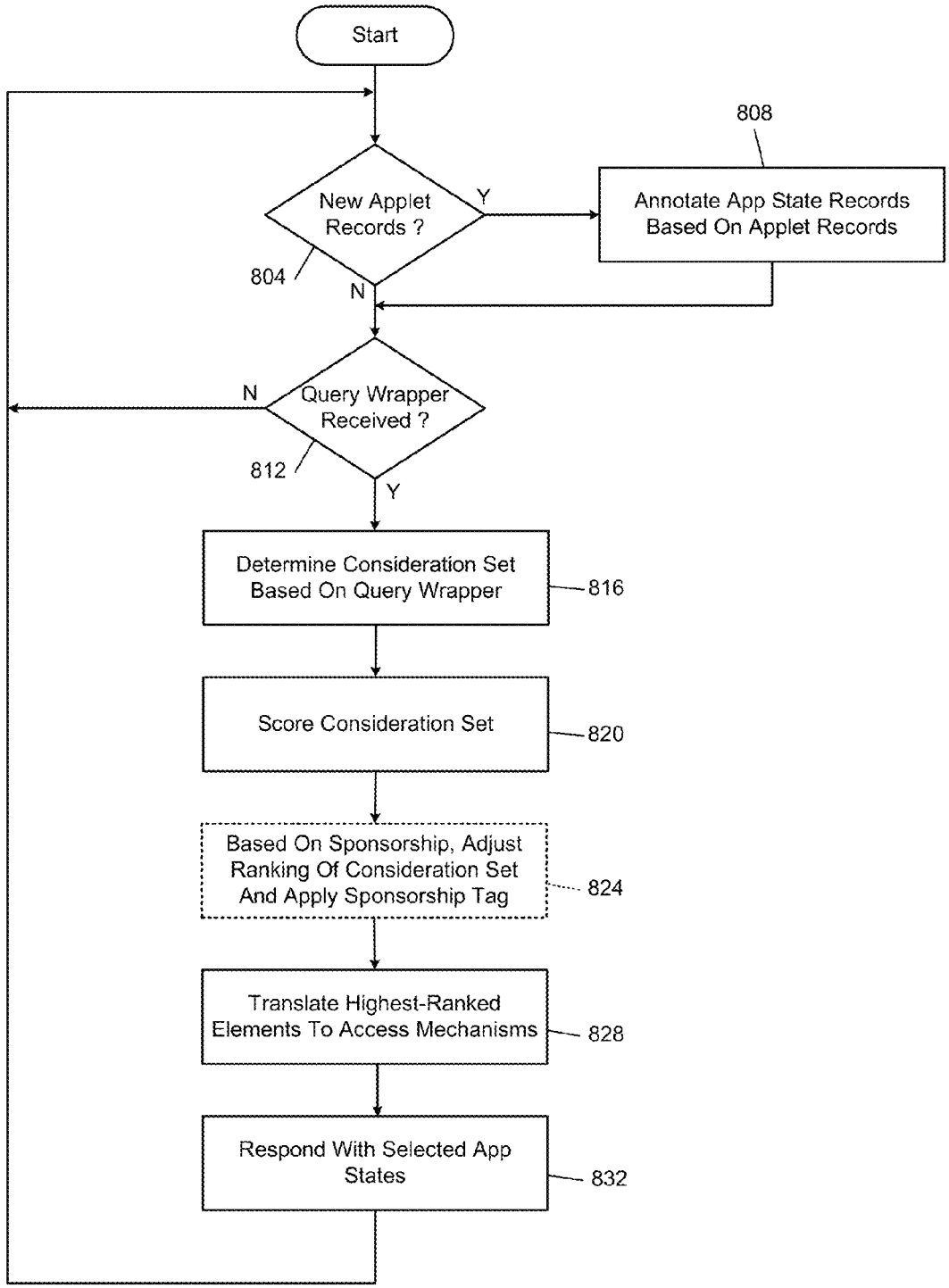
FIG. 8 is a flowchart of example operation of a search system.

In FIG. 8, a flowchart of example operation of a search system begins at 804. If new applet records are available from the applet system, control transfers to 808; otherwise, control transfers to 812. At 808, control annotates app state records based on the new applet record. For example, when an applet is available that corresponds to a first state of a first app, the first state may be supplemented with an applet access mechanism. Then, when the first state is included in search results, the corresponding applet may be presented in addition to, or instead of, the first state itself. Control then continues at 812.

At 812, control determines whether a query wrapper has been received. If so, control transfers to 816; otherwise, control returns to 804. At 816, control determines a consideration set of app states based on the query wrapper. Control continues at 820, where the consideration set is scored. For example, app states that appear to have a higher relevance to the search query may receive a higher score. In some implementations, app states that have an applet access mechanism may have a higher score because the applet may represent a more efficient way to access the functionality of the app state.

Control continues at 824, where in some implementations, the consideration set ranking is adjusted based on whether the app states or their corresponding apps have been sponsored, such as by an advertiser. In addition, app states that were not part of the organic results in the consideration set may be added to the consideration set based on their sponsorship. A sponsorship tag may be associated with sponsored results so that the search app can visually distinguish sponsored results. For example only, sponsored results that were organically identified may be moved to a top of a user display, while sponsored results that were not organically identified may remain at the same location in their ranking but be highlighted or otherwise visually emphasized.

Control continues at 828, where the highest-ranked elements of the consideration set are translated into corresponding access mechanisms. For example, if an app state in the consideration set corresponds to an app that is already installed on the user device that sent the query wrapper, an access mechanism that relies on the app already being installed can be sent. In another example, an app state corresponding to an app that cannot be installed on the user device for some reason, but does have a web access mechanism, will lead to the web access mechanism being selected.

For an app state that has an applet access mechanism, the applet access mechanism may be preferred in any situation where the app is not already installed. The user may be presented with a choice (such as shown in FIG. 1) between installing the entire app or executing the applet. Control continues at 832, where control responds to the user device with the selected app states and their associated access mechanisms. Control then returns to 804.

Figure 9:
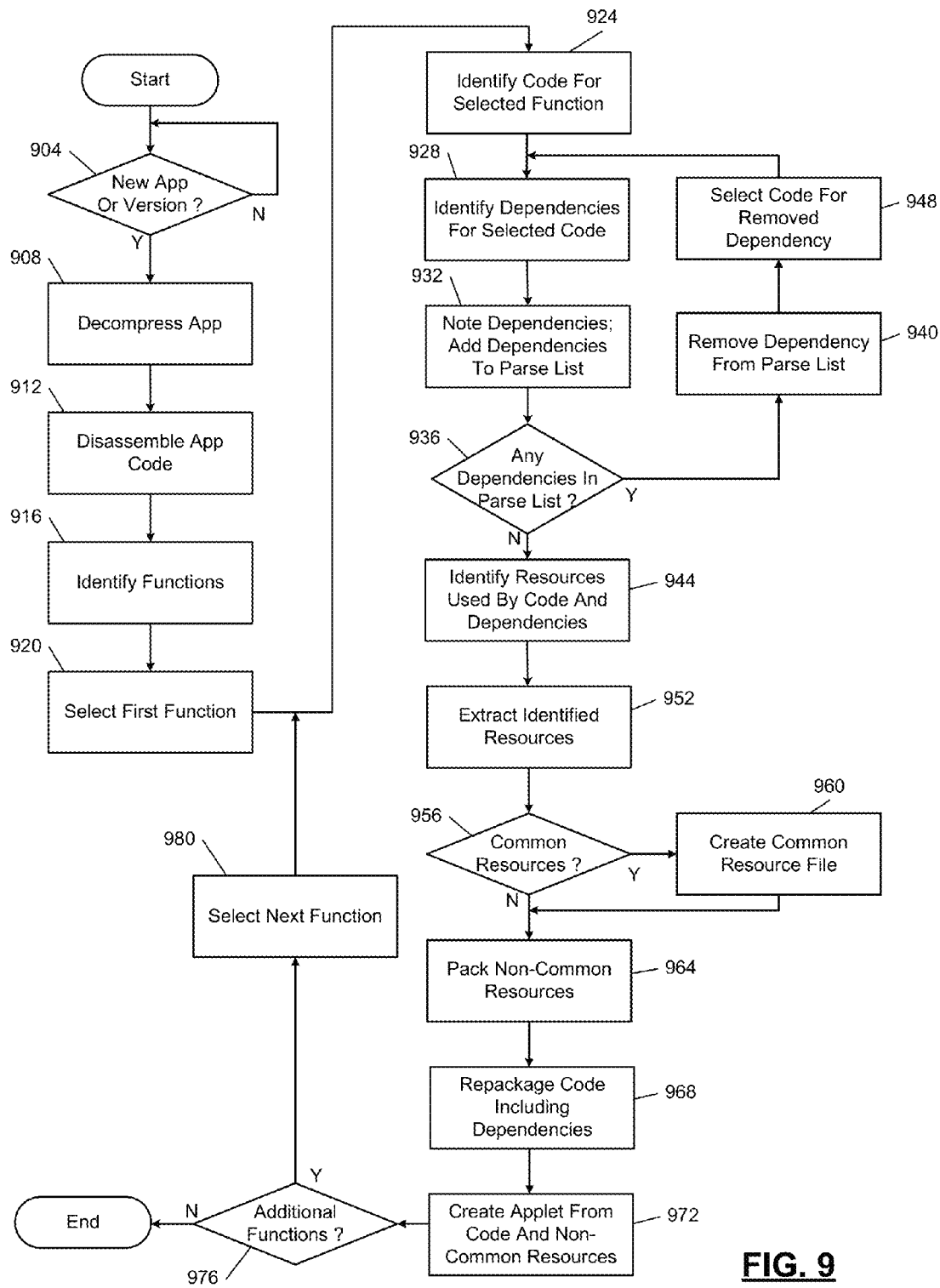
FIG. 9 is a flowchart of example operation of an applet extractor.

In FIG. 9, example operation of the applet extractor is presented. Control begins at 904, where if there is a new app or a new version of an app available for processing, control transfers to 908; otherwise, control remains at 904. At 908, control decompresses and/or unpacks the app. At 912, control disassembles the app code. At 916, control identifies functions performed by the app. At 920, control selects the first function of the identified functions. Each function will be processed in turn. Control continues at 924, where control identifies the code corresponding to the first function.

At 928, control identifies any dependencies for the selected code. At 932, control notes the dependencies, such as in a graph or tree structure. Control also adds each code segment from the dependencies to a parse list. If no dependencies were identified, the parse list is left as is. At 936, if there are any dependencies remaining in the parse list, control transfers to 940; otherwise, control transfers to 944. At 940, control removes a dependency from the parse list (such as from the beginning or the end of the list). At 948, control selects code corresponding to the removed dependency and returns to 928. In this way, the dependency tree is iteratively traversed until all code dependencies are identified for the selected function.

At 944, control identifies resources used by the code for the selected function, including code for the dependencies. At 952, control extracts the identified resources from the app. At 956, control identifies whether any resources are in common across functions. If so, control creates or supplements a common resource file at 960; otherwise, control continues at 964.

At 960, the common resource file is supplemented with any additional common resources. In some implementations, there may be multiple overlapping sets of resources such that one set of resources is common to a first set of applets while various other resources are only common to a second set of applets. In such implementations, multiple common resource files may be created, and any given applet may therefore require resources from one or more common resource files. Control continues at 964.

At 964, control packs non-common resources into a resource file, which may include optimizing and compressing the resources. At 968, control repackages code for the selected function including code required by the dependencies. At 972, control creates an applet from the packaged code and the non-common resources. At 976, control determines whether there are additional functions to be processed from the identified functions of 916. If so, control transfers to 980; otherwise, control ends. At 980, control selects the next function and returns to 924.

Figure 10A:
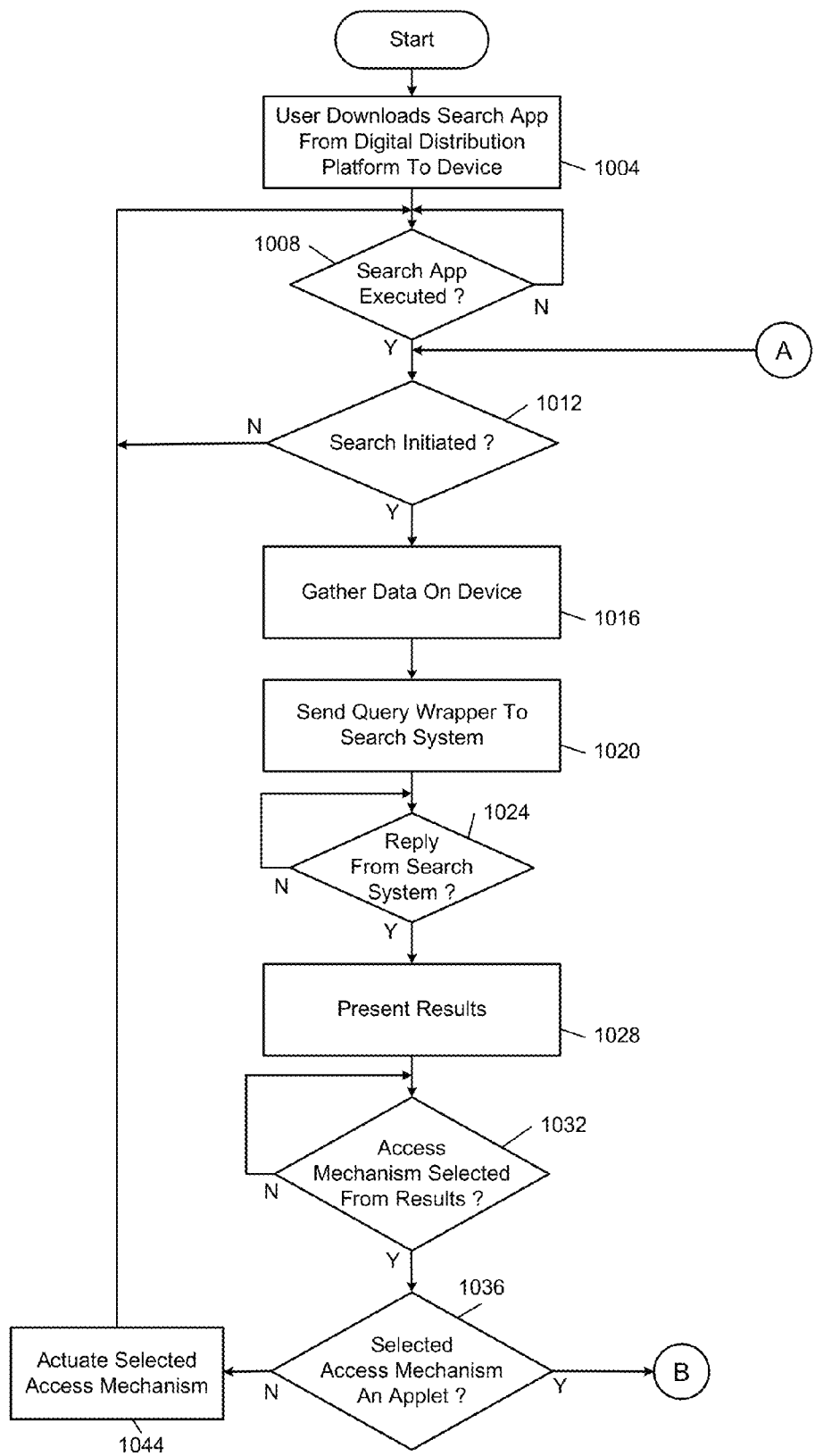
FIG. 10A and FIG. 10B together form a flowchart of example operation of a user device in relation to a search app according to the principles of the present disclosure.

In FIG. 10A, example operation of a user device and search app is presented. At 1004, the user downloads the search app from a digital distribution platform to the user device. At 1008, if the search app is executed, control progresses to 1012; otherwise, control returns to 1008. At 1012, control determines whether the user initiated a search. If so, control transfers to 1016; otherwise, control returns to 1008.

At 1016, control gathers data on the user device, such as installed applications, active user accounts, and device specifications. Device specifications may include hardware specifications and operating system version number. At 1020, control sends the query wrapper to the search system. At 1024, control waits for a reply from the search system and then continues at 1028. At 1028, control presents results received from the search system.

At 1032, control waits until an access mechanism is selected from the results and then continues at 1036. At 1036, if the selected access mechanism is an applet, control transfers to 1040 of FIG. 10B; otherwise, control transfers to 1044. At 1044, control actuates the selected access mechanism (which may include executing a script, replaying user interface events, and downloading/installing an app). Control then returns to 1008.

Figure 10B:
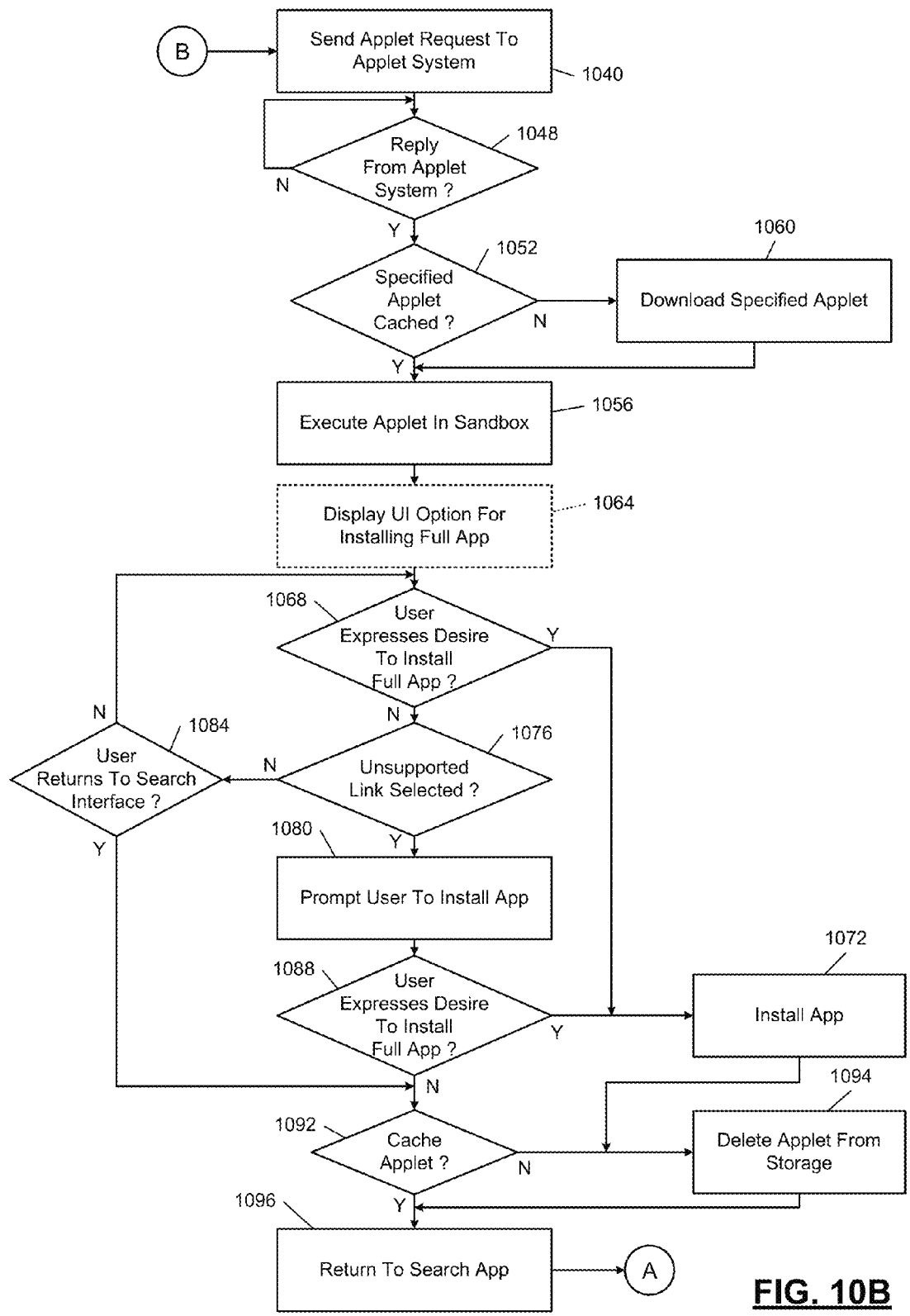

At 1040 in FIG. 10B, control sends an applet request to the applet system. Control continues at 1048, where control waits for a reply from the applet system before continuing at 1052. At 1052, control determines whether the applet specified in the reply is cached. If so, control transfers to 1056; otherwise, control transfers to 1060. At 1060, control downloads the specified applet from the applet system before continuing at 1056.

At 1056, control executes the applet in a sandbox. As part of executing the applet, control optionally at 1064 displays a user interface option for installing the full app. This allows a user who appreciates the functionality of the applet to install the full app. This also allows a user who wishes to access other functionality in the app to install the full app. At 1068, control determines whether the user expresses a desire to install a full app. If so, control transfers to 1072; otherwise, control transfers to 1076.

At 1076, control determines whether an unsupported link has been selected. If so, control transfers to 1080; otherwise, control transfers to 1084. An unsupported link may result from the user interface of the function contained within the applet having links or other associations with other functions of the original app. These links may still be visible in the user interface, but the associated functionality is not available. These are referred to as unsupported links.

The functionality offered at the unsupported link may be available by installing the full app or by acquiring a corresponding applet. At 1080, because an unsupported link has been selected, control prompts the user to install the full app. At 1088, if the user expressed a desire to install the full app, control transfers to 1072; otherwise, controls transfers to 1092.

At 1092, control determines whether the applet should be cached. If so, control transfers to 1094; otherwise, control transfers to 1096. At 1094, the applet is deleted from storage and control continues at 1096. At 1096, control returns the user to the search app. Control then continues at 1012 in FIG. 10A.

The decision of whether to cache the applet may be based on how many times the applet has been executed. After a threshold number of times, the applet may be cached for future use. In other implementations, the frequency of use may guide eviction policy. A certain amount of storage space is reserved for applet caching and the least-frequently or least-recently used applet may be evicted to make room for new applets. In other implementations, eviction may be based on score, with lower score apps being evicted. The score is related to at least one of frequency and recency, and inversely related to storage size. Metadata regarding frequency and recency of applet usage may be retained even when the applet is deleted to allow for longer trends to manifest themselves.

At 1072, control installs the app or provides the user the ability to install the app. This may be accomplished by navigating the app installation state of the digital distribution platform. Even when installation of the app is automated, user confirmation may still be required. Control then continues at 1094 to delete the now-redundant applet from storage.

Figure 11:
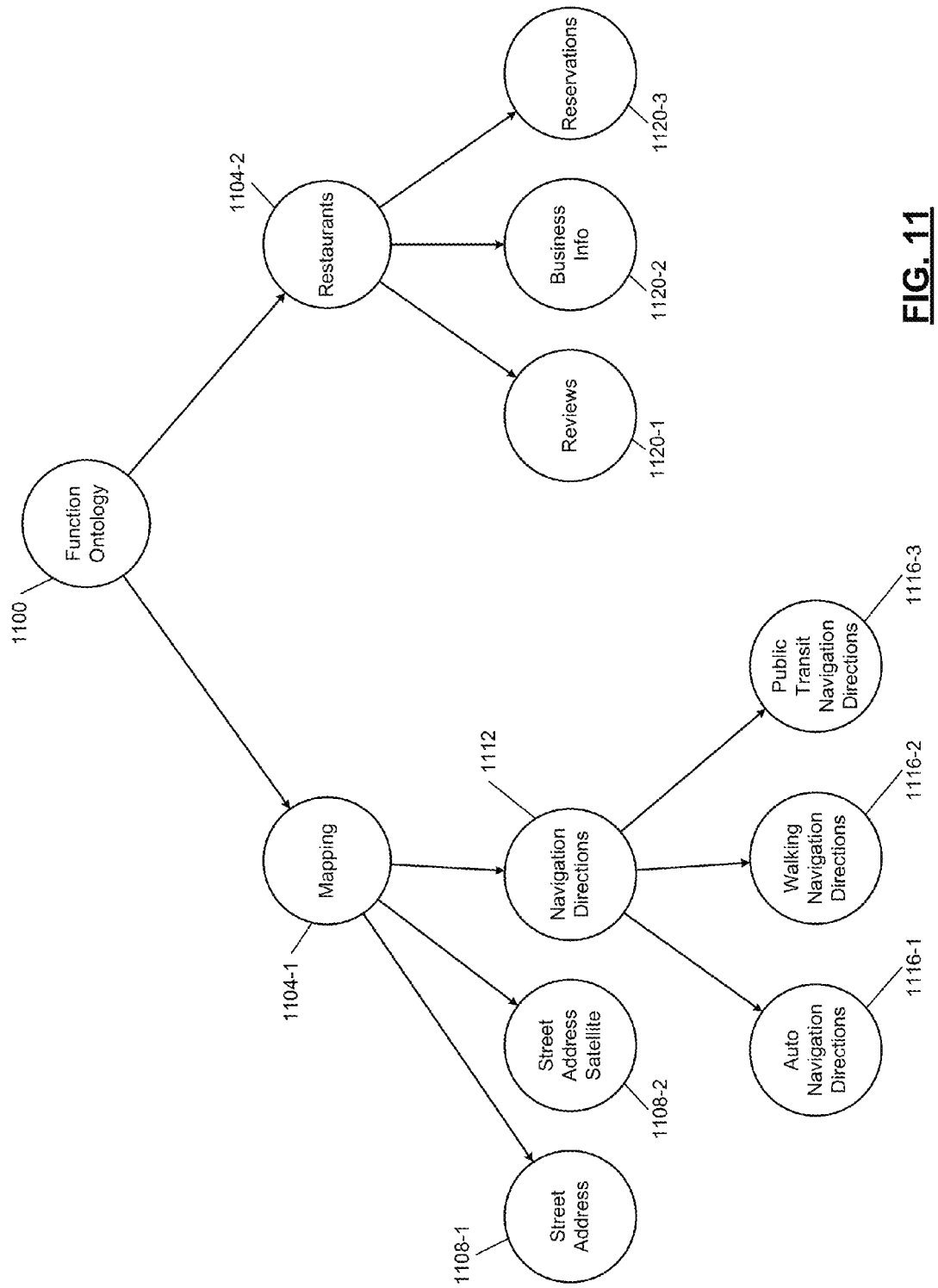
FIG. 11 is a graphical example of an excerpt of a function ontology.

In FIG. 11, an excerpt of an example function ontology 1100 is shown. In some implementations, the function ontology 1100 may be developed by an operator of the applet system 200 to categorize the functionality of app functions and their corresponding applets. In other implementations, the applet system 200 may not classify the functions, or may even assign no semantic meaning to the functions.

Although an ontology with a hierarchical tree structure is shown in FIG. 11, classifying the functions of apps is not limited to ontologies or to tree structures. For example, a function classification may simply include a flat list of functions, which may or may not have interrelations. The interrelations may form a directed or undirected graph that does not conform to a tree structure.

The function ontology 1100 includes a number of branch nodes (such as mapping branch node 1104-1 and restaurants branch node 1104-2), which may represent different industry verticals. The function ontology 1100 includes street address mapping leaf node 1108-1 and street address with satellite imagery leaf node 1108-2 underneath the branch node 1104-1.

Each of the leaf nodes corresponds to a particular function offered by one or more apps. A navigation directions branch node 1112 underneath the branch node 1104-1 encompasses auto navigation directions leaf node 1116-1, walking navigation directions leaf node 1116-2, and public transit navigation directions leaf node 1116-3. The function ontology 1100 also includes reviews leaf node 1120-1, business information leaf node 1120-2, and reservations leaf node 1120-3 underneath the branch node 1104-2.

The function ontology 1100 may be arranged in a wide variety of ways and may be divided at varying levels of granularity. For example, the leaf nodes 1108-1 and 1108-2 may be combined under a common street address branch node, where leaf node 1108-1 would simply specify no satellite imagery while leaf node 1108-2 would specify the presence of satellite imagery.

Decisions on how to structure the function ontology 1100 may be made by operators of the applet system 200 based on, for example, how many apps perform each function. If a leaf node exists that specifies a function only performed by one app, that leaf node may be combined with other leaf nodes so that a selection of applications is available.

Figure 12:
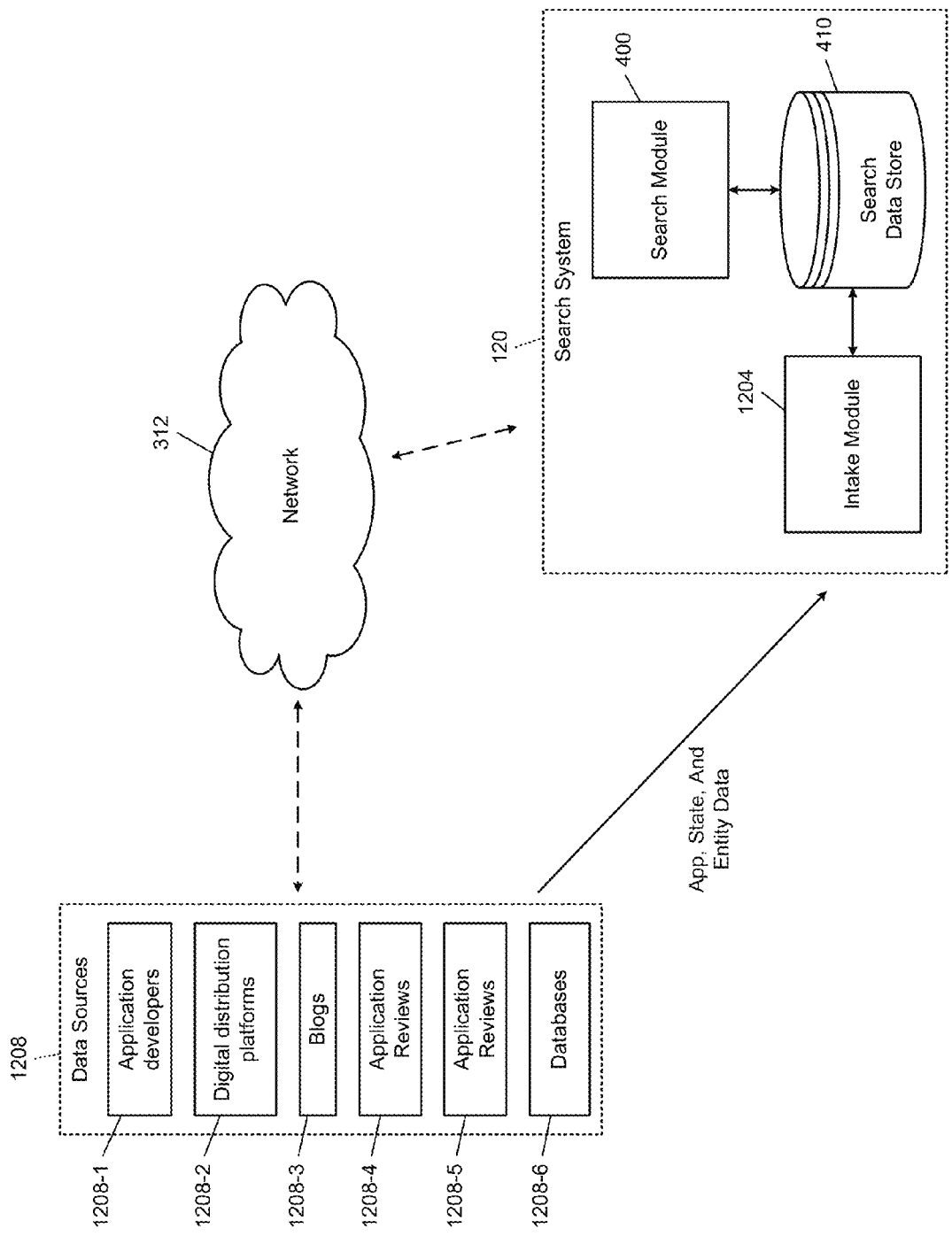
FIG. 12 is a block diagram showing example data sources for the search system.

As seen in FIG. 12, the search data store 410 may be maintained and updated by an intake module 1204 and/or a maintenance component (not shown) of the search system 120 from the data sources 1208. The search data store 410 may store data in databases, indices, tables, files, and other data structures, which may be populated from the data sources 1208. The search data store 410 may store application state records corresponding to specific states of applications.

The intake module 1204 may include various parsers and other ETL (extract, transform, and load) processes to adapt data from the data sources 1208 for storage in the search data store 410. In some implementations, data may be manually entered and/or manually transformed into a format usable by the search data store 410. The data sources 1208 may include data from application developers 1208-1, such as application developers' websites and data feeds provided by developers.

The data sources 1208 may include digital distribution platforms 1208-2, accessed via the web or via an app. Digital distribution platforms provide native applications to user devices. Example digital distribution platforms include the GOOGLE PLAY digital distribution platform by Google, Inc., the APP STORE digital distribution platform by Apple, Inc., and the WINDOWS PHONE digital distribution platform by Microsoft Corp.

The data sources 1208 may also include other websites, such as blogs 1208-3, application review websites 1208-4, and social networking sites 1208-5, such as the FACEBOOK social networking application and website by Facebook, Inc. and the TWITTER social networking application and website by Twitter, Inc.

The data sources 1208 may also include online databases 1208-6 of data related to movies, television programs, music, restaurants, etc. Each of the data sources 1208 may have independent ontologies and may be updated at different rates. Therefore, the search data store 410 may be updated from each of the data sources 1208 at different rates. In addition, credibility and accuracy of data may differ across the data sources 1208. Measures of reliability, timeliness, and accuracy may be stored in the search data store 410 and may be used to weight search results obtained from the data sources 1208.

Figure 13B:
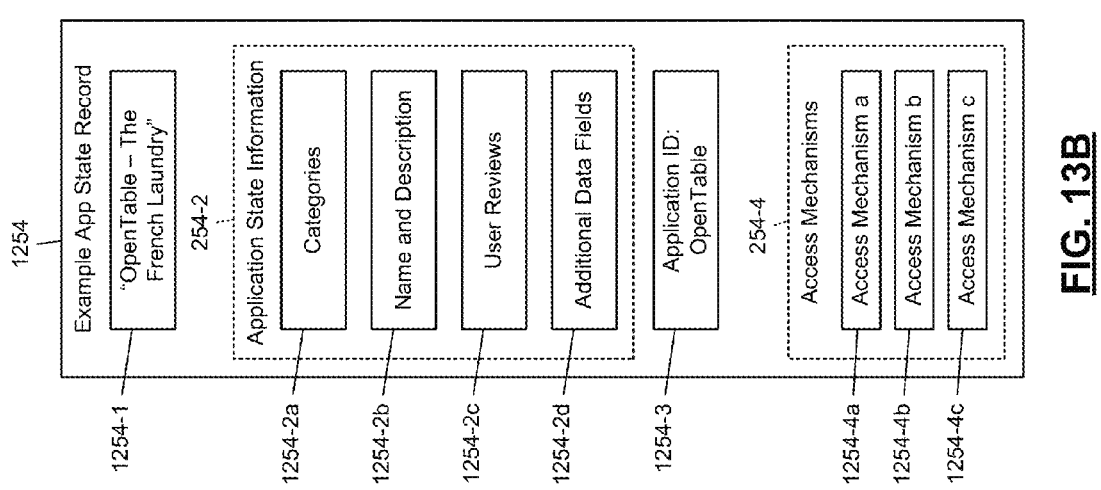
FIG. 13B is an example app state record according to the format of FIG. 13A.
Figure 13A:
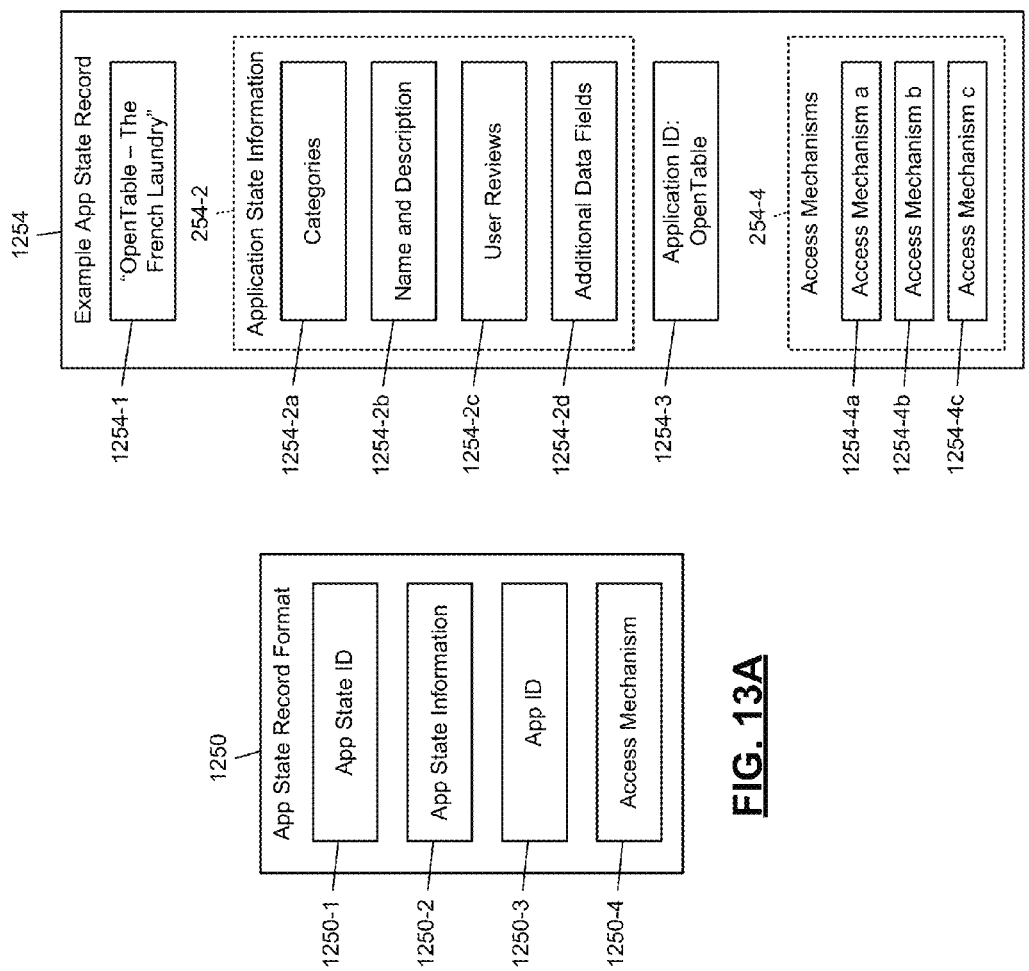
FIG. 13A is an example format for an app state record.

In FIG. 13A, an example format of an app state record 1250 includes an app state identifier (ID) 1250-1, app state information 1250-2, an app identifier (ID) 1250-3, and one or more access mechanisms 1250-4. The app state ID 1250-1 may be used to uniquely identify the app state record 1250 in the search data store 410. The app state ID 1250-1 may be a string of alphabetic, numeric, and/or special (e.g., punctuation marks) characters that uniquely identifies the associated app state record 1250. In some examples, the app state ID 1250-1 describes the application state in a human-readable form. For example, the app state ID 1250-1 may include the name of the application referenced in the access mechanisms 1250-4.

In a specific example, an app state ID 1250-1 for an Internet music player application may include the name of the Internet music player application along with the song name that will be played when the Internet music player application is set into the specified state. In some examples, the app state ID 1250-1 is a string formatted similarly to a uniform resource locator (URL), which may include an identifier for the application and an identifier of the state within the application. In other implementations, a URL used as the app state ID 1250-1 may include an identifier for the application, an identifier of an action to be provided by the application, and an identifier of an entity that is the target of the action.

For example only, see FIG. 13B, which shows an example app state record 1254 associated with the OPENTABLE application from OpenTable, Inc. The OPENTABLE application is a restaurant-reservation application that allows users to search for restaurants, read reviews, and make restaurant reservations. The example app state record 1254 of FIG. 13B describes an application state of the OPENTABLE application in which the OPENTABLE application accesses information for THE FRENCH LAUNDRY restaurant, a Yountville, Calif. restaurant. An app state ID 1254-1 for the example app state record 1254 is shown as "OpenTable—The French Laundry."

Another implementation of the displayed app state ID 1254-1 is based on a triplet of information: {application, action, entity}. The triplet for the app state record 1254 may be {"OpenTable", "Show Reviews", "The French Laundry"}. As mentioned above, this triplet may be formatted as a URL, such as the following: "func://www.OpenTable.com/Show_Reviews/The_French_Laundry". Note that a different namespace is used ("func://") to differentiate from the standard web namespace ("http://"), as the URL-formatted ID may not resolve to an actual web page. For example only, the OpenTable website may use a numeric identifier for each restaurant in their web URLs instead of the human-readable "The_French_Laundry."

Continuing with FIG. 13A, the app state information 1250-2 may include data that describes an app state into which an application is set according to the access mechanisms 1250-4. The types of data included in the app state information 1250-2 may depend on the type of information associated with the app state and the functionality specified by the access mechanisms 1250-4. The app state information 1250-2 may include a variety of different types of data, such as structured, semi-structured, and/or unstructured data. The app state information 1250-2 may be automatically and/or manually generated and updated based on documents retrieved from various data sources, which may include crawling of the apps themselves.

In some examples, the app state information 1250-2 includes data presented to a user by an application when in the app state corresponding to the app state record 1250. For example, if the app state record 1250 is associated with a shopping application, the app state information 1250-2 may include data that describes products (such as names and prices) that are shown in the app state corresponding to the app state record 1250. As another example, if the app state record 1250 is associated with a music player application, the app state information 1250-2 may include data that describes a song (such as by track name and artist) that is played or displayed when the music player application is set to the specified app state.

When the app state record 1250 corresponds to a default state of an application, the app state information 1250-2 may include information generally relevant to the application and not to any particular app state. For example, the app state information 1250-2 may include the name of the developer of the application, the publisher of the application, a category (e.g., genre) of the application, a text description of the application (which may be specified by the application's developer), and the price of the application. The app state information 1250-2 may also include security or privacy data about the application, battery usage of the application, and bandwidth usage of the application. The app state information 1250-2 may also include application statistics, such as number of downloads, download rate (for example, average downloads per month), download velocity (for example, number of downloads within the past month as a percentage of total downloads), number of ratings, and number of reviews.

In FIG. 13B, the example app state record 1254 includes app state information 1254-2, including a restaurant category field 1254-2a of THE FRENCH LAUNDRY restaurant, a name and text description field 1254-2b of THE FRENCH LAUNDRY restaurant, user reviews field 1254-2c of THE FRENCH LAUNDRY restaurant, and additional data fields 1254-2d.

The restaurant category field 1254-2a may include multiple categories under which the restaurant is categorized, such as the text labels "French cuisine" and "contemporary." The name and text description field 1254-2b may include the name of the restaurant ("The French Laundry") and text that describes the restaurant. The user reviews field 1254-2c may include text of user reviews for the restaurant. The additional data fields 1254-2d may include additional data for the restaurant that does not specifically fit within the other defined fields, such as a menu, prices, and operating hours.

Continuing with FIG. 13A, the app ID 1250-3 uniquely identifies an application associated with the app state record 1250. For example, a value for application ID 1254-3 in the app state record 1254 uniquely identifies the OpenTable application. The application ID 1254-3 may refer to a canonical OpenTable software product that encompasses all of the editions of the OpenTable application, including all the native versions of the OpenTable application across platforms (for example, IOS and ANDROID operating systems) and any web editions of the OpenTable application.

The access mechanisms 1250-4 specify one or more ways that the state specified by the app state record 1250 can be accessed. For any given user device, only some of the access mechanisms 1250-4 may be relevant. For illustration, the example app state record 1254 depicts three access mechanisms 1254-4, including access mechanism "a" 1254-4a, access mechanism "b" 1254-4b, and access mechanism "c" 1254-4c.

For example, the access mechanism 1250-4a may include a reference to a native IOS operating system edition of the OPENTABLE application along with one or more operations to be performed by the user device. For example, the access mechanism 1250-4a may include an application resource identifier for the native iOS edition of the OPENTABLE application and one or more operations that navigate to the state in the OPENTABLE application for THE FRENCH LAUNDRY restaurant.

The access mechanism 1250-4b may include a reference to a native ANDROID operating system edition of the OPENTABLE application along with one or more operations to be performed by the user device to navigate to the state in the ANDROID OPENTABLE application for THE FRENCH LAUNDRY. The access mechanism 1250-4c may include a reference to a web edition of the OPENTABLE application, such as a URL that corresponds to a web page for THE FRENCH LAUNDRY restaurant on the OPENTABLE web site.

Figure 14:
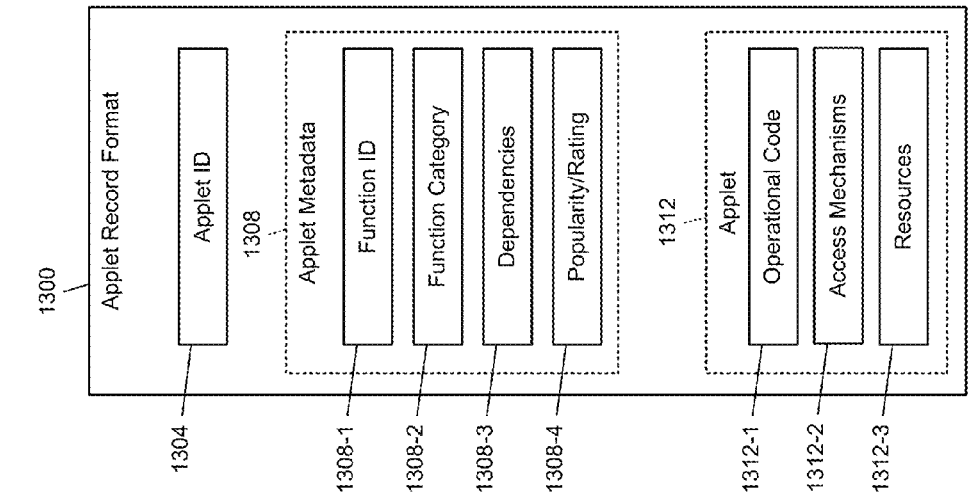
FIG. 14 is an example format of an applet record.

In FIG. 14, an example format 1300 for applet records stored in the applet data store 736 is shown. An applet ID 1304 may uniquely identify the applet within the applet package store 512 of FIG. 5. Although applet metadata 1308 is shown as part of the example format 1300, the applet metadata 1308 may be stored separately, such as in the applet metadata store 516 of FIG. 5. The applet metadata 1308 may include a function ID 1308-1 that identifies the function performed by the applet uniquely within a function classification. A function category 1308-2 may identify the branch node above the function within the function classification.

A dependencies field 1308-3 indicates what requirements must be met by the user device in order to run the applet. For example only, the dependencies field 1308-3 may include a list of operating systems and minimum/maximum version numbers within which the applet can execute. Additionally or alternatively, the dependencies field 1308-3 may specify a required version of the dynamic execution framework within which the applet will execute.

A popularity/rating field 1308-4 may specify an all-time popularity of the applet or app from which the applet was developed. In other implementations, popularity may be determined based on a limited timeframe, such as the past month or year. Popularity may also reflect a derivative value of the popularity (such as download velocity—that is, how fast downloads of an app are increasing).

The popularity may also be based on how often the applet is used by a host app. The popularity may also be based on how often the applet is accessed by all devices implementing the dynamic execution framework in the aggregate. A rating may be based on user feedback of an app or an applet, and may be based on external data sources, such as reviews, blog posts, digital distribution platform ratings, etc.

An applet container 1312 includes operational code 1312-1 to implement the functionality of the applet upon activation. For example, if an applet provides mapping capability, the operational code 1312-1 may implement an interactive map, allowing for panning, scrolling, zooming, etc.

Access mechanisms 1312-2 may be used to allow access to additional functionality beyond what is available using the operational code 1312-1. When certain functionality of the applet is accessed, one or more of the access mechanisms 1312-2 may be used to open another app to a desired state to provide the functionality. Continuing with the mapping example, one of the access mechanisms 1312-2 may open the mapping app stored on the user device from the same developer that developed the applet. While the operational code 1312-1 may allow for an interactive map that allows pan and zoom, one of the access mechanisms 1312-2 may be used to reach a mapping app that can display additional information, such as satellite imagery or bike routes.

Resources 1312-3 may include elements required for user interface creation, including images, fonts, style sheets, etc.

Query Wrapper and Results

FIG. 15 shows example contents of a query wrapper 1412, which may be encrypted with a public key of the search system 120. By encrypting the query wrapper with the search system's public key, only the search system 120, which is in possession of the corresponding private key, can decrypt the query wrapper 1412. This prevents man-in-the-middle eavesdropping of queries performed by the user.

The query wrapper 1412 includes a query object 1412-1, which may include a plaintext string, and a representation of installed apps 1412-2. For example only, apps known to be based on paid subscriptions are generally not good results for a user device unless the app is already installed. This relies on the assumption that if the user were paying for the subscription, then the corresponding app would be installed.

In various implementations, an exhaustive listing of all installed apps, including titles and version numbers, may be included. In other implementations, a bit field may be specified for the one hundred most-popular apps. In other words, one hundred binary digits each correspond to whether a respective one of those most-popular apps is installed (for example, with a zero indicating that the app is not installed and a one indicating that the app is installed). To allow for this shortened bit field format, the set of apps must be pre-arranged. Although one hundred is used as an example, for efficient storage a power of two (such as 128) may be used.

Another mechanism for indicating installed apps using a limited number of bits is a Bloom filter. To achieve storage compression, the output of a Bloom filter does not definitively designate that a certain app is present; the Bloom filter output only definitively designates that certain apps are not present.

An installed accounts data structure 1412-3 may report which accounts are present on the user device, and any relevant details about those accounts that might be available. This may impact how relevant a result is. For example, if the user has expressed an interest in streaming a movie, but their account on a particular service does not allow streaming of that movie, the corresponding state may receive a reduced score.

Device info 1412-4 of the device transmitting the query wrapper 1412 may be included. This information may include the operating system and the operating system version number, geolocation data for the device, an identity of the app sending the query wrapper 1412, an identity of the app developer of the app, screen resolution, portrait/landscape orientation, and sensor capability (precision of accelerometer, presence of heart rate sensor, etc.).

The app or app developer identities may be used by the search system 120 to apply pre-arranged parameters. The app identity may also be used by the search system 120 to remove that app, related states, and related applets from the results—in other words, to avoid returning a result that points back to the very same app that sent the query wrapper 1412.

FIG. 16 depicts an example format for an app state results structure 1450. The app state results structure 1450 may be provided as a file over any suitable protocol, such as HTTP (hypertext transfer protocol) or FTP (file transfer protocol), or as an object sent over a higher-level protocol such as SOAP (simple object access protocol). The app state results may be physically transported across a network using multiple packets, frames, etc.

The app state results structure 1450 includes an app list 1450-1, which may include an array of strings, each string storing an app name. The order of the array may generally be from most relevant to least relevant, though the order may be adjusted based on sponsorship. The number of apps provided in the app list 1450-1 may be chosen according to a resolution of the device sending the query wrapper. For example, a device with a larger screen and/or higher resolution may receive a larger number of apps.

An app state list 1450-2 includes an array of pairs, where a first value of each pair corresponds to an app state (which may be a title, such as for THE FRENCH LAUNDRY restaurant) and the second value of each pair corresponds to the associated app (such as for the YELP app).

An images field 1450-3 may include encoded images, such as icons, for each of the apps in the app list 1450-1. In other implementations, the images field 1450-3 may include encoded images, such as screenshots, for each of the app states in the app state list 1450-2.

An app access links field 1450-4 specifies access mechanisms for a default state of each of the apps in the app list 1450-1. For example, the access links may include commands to open the app if installed and/or links to a digital distribution platform to download an app that is not installed. Another access mechanism may be a URL (uniform resource locator) to access a web-based app through a browser. When the app state results structure 1450 is returned, code within the app may determine whether open versus download is the appropriate action based on the specific installation status of each app.

An app state access links field 1450-5 specifies access mechanisms for each of the app states in the app state list 1450-2. One possible access mechanism for some app states is executing an applet. For apps not yet installed on the user device, the applet access mechanism, when available, may be preferred over downloading and installing the entire app.

Additional metadata 1450-6 may include a rating for each app (such as a number of stars), a text description for each app, review text and metrics (such as number of reviews), and a designation of sponsorship. The sponsorship designation may be a simple binary flag or may include an indication of sponsorship level. For example, a sponsor may be willing to pay a greater amount for a new install than for an existing app. This level of interest by the sponsor may allow the app to promote the sponsored app more prominently in hopes of recognizing that revenue.

The additional metadata 1450-6 may include download velocity (the number of downloads over a recent time horizon) or other indicators of trending popularity of an app. A new and valuable app may not yet have a large installed base, but may show rapid growth in number of downloads. Therefore, trending popularity may be used as a signal to rank the display of apps, with trending apps moved higher up in a results list. Further, a visual indication of trending, such as text ("trending" or a word correlated with trending, such as "popular") or an icon, may be shown in close proximity to an app for which a trending metric of the app is above a threshold. The threshold may be an absolute threshold for all apps, or may be relative/normalized to the market segment in which the app exists or to the other apps in the results list.

Action Query and Response

In FIG. 17, an example applet request 1504 includes an identifier 1504-1 of an applet. In some implementations, the identifier may include an indication of version number, which would have been provided in the access link that designated the applet. The applet request 1504 may also include device info, which may include a subset or a superset of the device info 1412-4 of FIG. 15.

In FIGS. 18-20, various formats for replying to an applet request are shown. FIG. 18 and FIG. 19 form a two-part reply, while FIG. 20 demonstrates an alternative combined reply. In FIG. 18, a first applet reply format 1600 includes an applet ID 1600-1, which uniquely identifies a specific version number (generally, the latest version number) of an applet. If the user device has a cached copy of the correct version number of the applet, the user device can execute the cached applet. Otherwise, the user device requests (not shown) the applet specified in the first applet reply. In response, as shown in FIG. 19, the applet system transmits a reply in the second applet reply format 1620, which includes the applet itself as content 1620-1.

The first applet reply format 1600 may also include a resource package ID 1600-2, which identifies a common resource package associated with the specified applet. The common resource package ID 1600-2 may also include a version number (generally, the latest version number). Unless the user device has already cached the indicated version of the common resource package, the user device requests (not shown) the common resource package.

In FIG. 19, the content 1620-1 may also include the common resource package if requested. In other implementations, the applet and the common resource package may be transmitted separately. The second applet reply format optionally includes a cryptographic signature 1620-2 of the content 1620-1. The cryptographic signature 1620-2 can be used to verify that no modification, intentional or unintentional, has been made to the content 1620-1 (either the applet or the common resource package) during transmission.

In FIG. 20, a combined applet reply format 1640 includes an applet ID 1640-1, a resource package ID 1640-2, an applet 1640-3 identified by the applet ID 1640-1, a cryptographic signature 1640-4 of the applet, a common resource package 1640-5 identified by the resource package ID 1640-2, and a cryptographic signature 1640-6 of the common resource package.

In various implementations, the user device may determine whether cached copies of the indicated applet and common resource package are already stored and, if so, cancel the transmission of the remainder of the combined applet reply. These implementations rely on the combined applet reply being serialized such that elements from the format of FIG. 20 are transmitted in order from top to bottom. Early termination of transmission saves on bandwidth, power consumption, and, in some cases, delay.

Because the common resource package is, as its name implies, common to other applets, there may be a better chance that the common resource package is already cached, even though the latest version of the applet is not. In such situations, the user device may cancel transmission of the remainder of the combined applet reply following reception of the applet and its cryptographic signature.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:

1. A mobile device comprising:
a user interface for a first application configured to allow a user of the mobile device to enter one or more search parameters, wherein the first application is installed on and executes on the mobile device;
a query wrapper module configured to generate a query wrapper based on the entered search parameters;
a search system communication module configured to transmit the query wrapper from the mobile device to a search system and receive a set of results from the search system, wherein the set of results selectively includes a first result corresponding to a first applet, and wherein the first applet includes operational code to implement a first function of the first applet;
a results presentation module configured to display the set of results within the first application to the user;
an access mechanism module configured to:
in response to the user selecting the first result, selectively trigger a first applet request to be sent to an applet distribution system,
wherein the first applet request instructs the applet distribution system to transmit the first applet from the applet distribution system to the mobile device; and
a sandbox created by the first application on the mobile device and configured to execute the first applet received from the applet distribution system while isolating the first applet from other applications on the mobile device, wherein the first applet includes native code for execution on an operating system of the mobile device,
wherein the user interface is configured to present visual output from the first applet executing in the sandbox to the user within the first application, and
wherein the user interface is configured to, in response to receiving a first user selection indicating the first function of the first applet, initiate performance by the first applet of the first function of the first applet.

2. The mobile device of claim 1 further comprising a wireless transceiver configured to transmit the query wrapper to the search system, receive the set of results from the search system, transmit the first applet request to the applet distribution system, and receive the first applet from the applet distribution system.

3. The mobile device of claim 1 wherein the mobile device further comprises a set of common libraries configured to selectively be dynamically linked with an applet executing in the sandbox.

4. The mobile device of claim 1 wherein the user interface, the query wrapper module, the search system communication module, the results presentation module, the access mechanism module, and the sandbox are implemented as part of a search application downloaded from a digital distribution platform and installed on the mobile device.

5. The mobile device of claim 1 wherein the user interface, the query wrapper module, the search system communication module, the results presentation module, the access mechanism module, and the sandbox are implemented as part of the operating system.

6. The mobile device of claim 1 wherein the query wrapper module is configured to include, within the query wrapper, a representation of applications installed on the mobile device.

7. The mobile device of claim 1 wherein:
the first applet was derived from a second application state of a second application;
the user interface is configured to provide a user interface element associated with the visual output from the first applet; and
the user interface is configured to, in response to user actuation of the user interface element, trigger downloading and installation of the second application onto the mobile device.

8. The mobile device of claim 1 wherein:
the set of results selectively includes a second result corresponding to a first application state of the first application installed on the mobile device; and
the access mechanism module is configured to, in response to the user selecting the second result, open the first application and, without further involvement of the user, transition to the first application state within the first application.

9. The mobile device of claim 1 wherein:
the set of results selectively includes a second result including a first access mechanism and a second access mechanism;
the first access mechanism corresponds to a second application state of a second application;
the second access mechanism corresponds to a second applet derived from the second application state;
the results presentation module is configured to, in response to the second application not being installed on the mobile device, offer both the first access mechanism and the second access mechanism to the user; and
the access mechanism module is configured to, in response to the second application not being installed on the mobile device:
in response to the user selecting a user interface element corresponding to the first access mechanism, download and install the second application, open the second application, and, without further involvement of the user, transition to the second application state within the second application; and
in response to the user selecting a user interface element corresponding to the second access mechanism, trigger a second applet request to be sent to the applet distribution system, wherein the second applet request instructs the applet distribution system to transmit the second applet to the mobile device for execution in the sandbox.

10. The mobile device of claim 1 wherein:
the set of results selectively includes a second result including a first access mechanism and a second access mechanism;
the first access mechanism corresponds to a second application state of a second application;
the second access mechanism corresponds to a second applet derived from the second application state;
the results presentation module is configured to:
in response to the second application being installed on the mobile device, offer only the first access mechanism to the user; and
in response to the second application not being installed on the mobile device, offer both the first access mechanism and the second access mechanism to the user;

the access mechanism module is configured to, in response to the second application being installed on the mobile device:
in response to the user selecting a user interface element corresponding to the first access mechanism, open the second application and, without further involvement of the user, transition to the second application state within the second application; and
the access mechanism module is configured to, in response to the second application not being installed on the mobile device:
in response to the user selecting a user interface element corresponding to the first access mechanism, download and install the second application, open the second application, and, without further involvement of the user, transition to the second application state within the second application; and
in response to the user selecting a user interface element corresponding to the second access mechanism, trigger a second applet request to be sent to the applet distribution system, wherein the second applet request instructs the applet distribution system to transmit the second applet to the mobile device for execution in the sandbox.

11. The mobile device of claim 1 further comprising:
an applet data store configured to selectively store the first applet received from the applet distribution system,
wherein the access mechanism module is configured to, in response to a subsequent result corresponding to the first applet being selected by the user, avoid triggering the first applet request and provide the stored first applet from the applet data store to the sandbox.

12. The mobile device of claim 11 further comprising an applet distribution system communication module configured to, in response to the subsequent result being selected by the user:
send an applet message to the applet distribution system, the applet message designating the first applet;
analyze a response to the applet message to determine a most recent version number of the first applet;
in response to the first applet being stored in the applet data store and a version number of the first applet in the applet data store matching the most recent version number, provide the stored first applet from the applet data store to the sandbox; and
in response to the most recent version of the first applet not being stored in the applet data store, download the most recent version of the first applet from the applet distribution system.

13. A method of operating a mobile device, the method comprising:
presenting a user interface for a first application to allow a user of the mobile device to enter one or more search parameters;
generating a query wrapper based on the entered search parameters;
transmitting the query wrapper from the mobile device to a search system;
receiving a set of results from the search system, wherein the set of results selectively includes a first result corresponding to a first applet, and wherein the first applet includes operational code to implement a first function of the first applet;
displaying the set of results within the first application to the user;
in response to the user selecting the first result, selectively triggering a first applet request to be sent to an applet distribution system, wherein the first applet request instructs the applet distribution system to transmit the first applet from the applet distribution system to the mobile device;

executing the first applet received from the applet distribution system in a sandbox created by the first application on the mobile device while isolating the first applet from other applications on the mobile device, wherein the first applet includes native code for execution on an operating system of the mobile device;

presenting visual output from the executing first applet to the user within the first application; and in response to receiving a first user selection indicating the first function of the first applet, initiating performance by the first applet of the first function of the first applet.

14. The method of claim 13 wherein the query wrapper is transmitted to the search system via a wireless transceiver, the set of results is received from the search system via the wireless transceiver, the first applet request is transmitted to the applet distribution system via the wireless transceiver, and the first applet is received from the applet distribution system via the wireless transceiver.

15. The method of claim 13 further comprising:
storing a set of common libraries; and
selectively dynamically linking one or more of the set of common libraries with an applet executing in the sandbox.

16. The method of claim 13 further comprising including, within the query wrapper, a representation of applications installed on the mobile device.

17. The method of claim 13 further comprising:
passing user interface events generated by the user to the executing first applet.

18. The method of claim 17 wherein:
the first applet was derived from a second application state of a second application;
the method further comprises providing a user interface element associated with the visual output from the first applet; and
the method further comprises, in response to user actuation of the user interface element, triggering downloading and installation of the second application onto the mobile device.

19. The method of claim 13 wherein:
the set of results selectively includes a second result corresponding to a first application state of the first application installed on the mobile device; and
the method further comprises, in response to the user selecting the second result, opening the first application and, without further involvement of the user, transitioning to the first application state within the first application.

20. The method of claim 13 wherein:
the set of results selectively includes a second result including a first access mechanism and a second access mechanism;
the first access mechanism corresponds to a second application state of a second application;
the second access mechanism corresponds to a second applet derived from the second application state;
the method further comprises, in response to the second application not being installed on the mobile device, offering both the first access mechanism and the second access mechanism to the user; and
the method further comprises, in response to the second application not being installed on the mobile device:

in response to the user selecting a user interface element corresponding to the first access mechanism, (i) downloading and installing the second application, (ii) opening the second application, and, (iii) without further involvement of the user, transitioning to the second application state within the second application; and in response to the user selecting a user interface element corresponding to the second access mechanism, triggering a second applet request to be sent to the applet distribution system, wherein the second applet request instructs the applet distribution system to transmit the second applet to the mobile device for execution.

21. The method of claim 13 wherein:
the set of results selectively includes a second result including a first access mechanism and a second access mechanism;
the first access mechanism corresponds to a second application state of a second application;
the second access mechanism corresponds to a second applet derived from the second application state;
the method further comprises:
in response to the second application being installed on the mobile device, offering only the first access mechanism to the user; and
in response to the second application not being installed on the mobile device, offering both the first access mechanism and the second access mechanism to the user;
in response to the second application being installed on the mobile device:
in response to the user selecting a user interface element corresponding to the first access mechanism, (i) opening the second application and, (ii) without further involvement of the user, transitioning to the second application state within the second application; and
in response to the second application not being installed on the mobile device:
in response to the user selecting a user interface element corresponding to the first access mechanism, (i) downloading and installing the second application, (ii) opening the second application, and, (iii) without further involvement of the user, transition to the second application state within the second application; and
in response to the user selecting a user interface element corresponding to the second access mechanism, triggering a second applet request to be sent to the applet distribution system, wherein the second applet request instructs the applet distribution system to transmit the second applet to the mobile device for execution.

22. The method of claim 13 further comprising:
selectively storing the first applet received from the applet distribution system in the mobile device; and
in response to a subsequent result corresponding to the first applet being selected by the user, (i) avoiding triggering the first applet request and (ii) providing the stored first applet from an applet data store for execution.

23. The method of claim 22 further comprising, in response to the subsequent result being selected by the user:
sending an applet message to the applet distribution system, the applet message designating the first applet;

analyzing a response to the applet message to determine a most recent version number of the first applet;

in response to the first applet being stored in the applet data store and a version number of the first applet in the applet data store matching the most recent version number, providing the stored first applet from the applet data store for execution; and in response to the most recent version of the first applet not being stored in the applet data store, downloading the most recent version of the first applet from the applet distribution system.

\* \* \* \* \*